(12) United States Patent
Safavi

(10) Patent No.: US 10,958,537 B2
(45) Date of Patent: Mar. 23, 2021

(54) METHOD FOR SPATIO-TEMPORAL MONITORING

(71) Applicant: MIST SYSTEMS, INC., Cupertino, CA (US)

(72) Inventor: S. Ebrahim Safavi, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 48 days.

(21) Appl. No.: 16/251,942

(22) Filed: Jan. 18, 2019

(65) Prior Publication Data

US 2020/0236008 A1 Jul. 23, 2020

(51) Int. Cl.
| | | |
|---|---|---|
| H04L 12/24 | (2006.01) | |
| H04B 17/327 | (2015.01) | |
| H04L 29/06 | (2006.01) | |
| H04W 16/22 | (2009.01) | |
| H04W 28/02 | (2009.01) | |
| H04L 29/12 | (2006.01) | |
| H04W 24/02 | (2009.01) | |

(52) U.S. Cl.
CPC ....... *H04L 41/5009* (2013.01); *H04B 17/327* (2015.01); *H04L 41/147* (2013.01); *H04L 63/0892* (2013.01); *H04W 16/22* (2013.01); *H04W 28/0268* (2013.01); *H04L 61/1511* (2013.01); *H04L 61/2015* (2013.01); *H04W 24/02* (2013.01)

(58) Field of Classification Search
CPC ............. H04L 41/5009; H04L 41/147; H04L 63/0892; H04L 61/1511; H04L 61/2015; H04B 17/327; H04W 16/22; H04W 28/0268; H04W 24/02
See application file for complete search history.

(56) References Cited

U.S. PATENT DOCUMENTS

| | | | |
|---|---|---|---|
| 9,648,464 | B1 | 5/2017 | Tran et al. |
| 10,554,738 | B1* | 2/2020 | Ren ................. G06F 9/505 |
| 2001/0051862 | A1* | 12/2001 | Ishibashi ............ H04L 41/147 |
| | | | 703/14 |
| 2005/0172027 | A1* | 8/2005 | Castellanos ........ H04L 41/5009 |
| | | | 709/229 |
| 2016/0359683 | A1* | 12/2016 | Bartfai-Walcott ........................ |
| | | | H04L 41/5009 |
| 2018/0220318 | A1* | 8/2018 | Uemura ............. H04W 24/10 |
| 2018/0337832 | A1 | 11/2018 | Yamashita |
| 2019/0182103 | A1* | 6/2019 | Pignataro ............ H04L 41/16 |

FOREIGN PATENT DOCUMENTS

WO WO-2020150564 A1 7/2020

OTHER PUBLICATIONS

"International Application Serial No. PCT/US2020/014012, International Search Report dated May 13, 2020", 4 pgs.
"International Application Serial No. PCT/US2020/014012, Written Opinion dated May 13, 2020", 7 pgs.

* cited by examiner

*Primary Examiner* — Luat Phung
(74) *Attorney, Agent, or Firm* — Schwegman Lundberg & Woessner, P.A.

(57) ABSTRACT

One exemplary aspect describes systems and methods for determining normal SLE behavior, determining when a SLE exhibits abnormal deterioration, and determining whether to take an action to mitigate what appears to be an indication of an abnormal SLE.

18 Claims, 15 Drawing Sheets

| Starting Time | Measured Parameter | Max Parameter | Min Parameter |
|---|---|---|---|
| t0 | P1 | P1 | P1 |
| | P2 | P2 | P2 |
| | P3 | P3 | P3 |
| | ⋮ | ⋮ | ⋮ |
| | ⋮ | ⋮ | ⋮ |
| | Pn | Pn | Pn |
| t0+w | P1 | P1 | P1 |
| | P2 | P2 | P2 |
| | P3 | P3 | P3 |
| | ⋮ | ⋮ | ⋮ |
| | ⋮ | ⋮ | ⋮ |
| | Pn | Pn | Pn |
| t0+2w | P1 | P1 | P1 |
| | P2 | P2 | P2 |
| | P3 | P3 | P3 |
| | ⋮ | ⋮ | ⋮ |
| | ⋮ | ⋮ | ⋮ |
| | Pn | Pn | Pn |

FIGURE 10a

| Starting Time | Measured Parameter | Max Parameter | Min Parameter |
|---|---|---|---|
| t0+delta | P1' <br> P2' <br> P3' <br> ⋮ <br> ⋮ <br> Pn' | P1' <br> P2 <br> P3' <br> ⋮ <br> ⋮ <br> Pn | P1 <br> P2' <br> P3 <br> ⋮ <br> ⋮ <br> Pn |
| t0+w+delta | P1' <br> P2' <br> P3' <br> ⋮ <br> ⋮ <br> Pn' | P1 <br> P2' <br> P3 <br> ⋮ <br> ⋮ <br> Pn | P1 <br> P2 <br> P3' <br> ⋮ <br> ⋮ <br> Pn |
| t0+2w+delta | P1' <br> P2' <br> P3' <br> ⋮ <br> ⋮ <br> Pn' | P1 <br> P2 <br> P3 <br> ⋮ <br> ⋮ <br> Pn | P1 <br> P2' <br> P3' <br> ⋮ <br> ⋮ <br> Pn |

FIGURE 10b

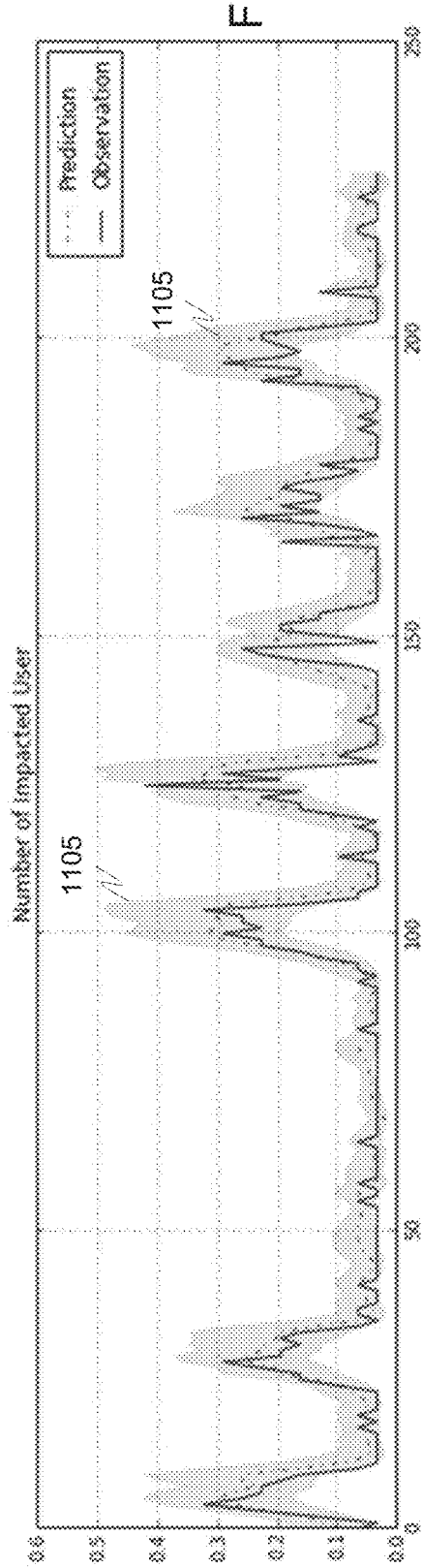
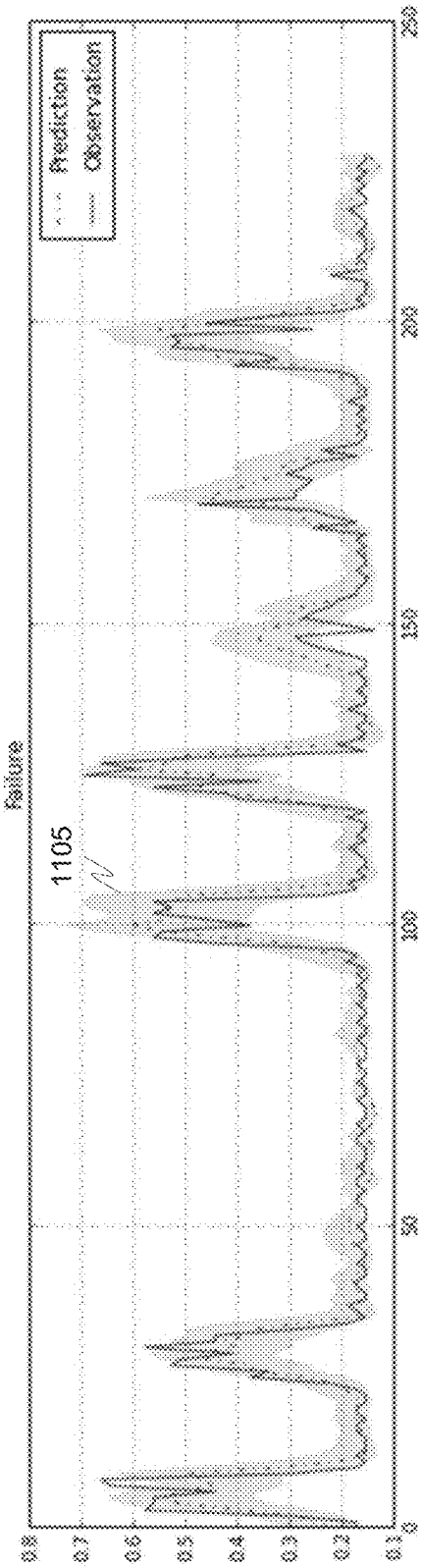
Fig. 11a
Fig. 11b

METHOD FOR SPATIO-TEMPORAL MONITORING

FIELD

One exemplary embodiment relates to monitoring wireless communications systems and, more particularly, to methods and/or apparatus for determining which system faults should be automatically corrected and/or elevated to the attention of IT personnel.

BACKGROUND

To ensure a high Service Level Experience (SLE), communication systems include methods to detect faults in real-time and to even predictively detect faults before a user notices the fault(s). One such fault detection system is described in related US patent application "METHODS AND APPARATUS FOR FACILITATING FAULT DETECTION AND/OR PREDICTIVE FAULT DETECTION," filed on Dec. 31, 2018, and assigned U.S. application Ser. No. 16/237,677, which is incorporated herein in its entirety.

Communications systems in general, and specifically wireless systems, include recovery methods. The simplest recovery process involves retries. For example, if a device attempts to connect to a network and fails, the device may retry and attempt to connect again. IT personnel can be notified in the event of a retry and called upon to rectify the underlying root cause of the problem should the system fail the auto-recovery/retry.

In a wireless system, a certain level of failure may be acceptable and deemed to be normal. For example, if many employees arrive in the morning and attempt to sign into the wireless system, the system may be overwhelmed by the large number of network registration requests resulting in a large number of failed network access attempts. Similarly, a specific access point (AP) in a large conference room may be overwhelmed on weekly bases when a large number of users assemble in that conference room and attempt to roam to the access point that serves that conference room at the same time. In either case, the issue may be resolve itself by the retry mechanism without requiring any manual intervention by any IT personnel.

These scenarios introduce conflicting demands on the system. On the one hand, to accelerate fault resolution, IT personnel should be notified as soon as possible about any system issues that may adversely impact the SLE. On the other hand, it is desirable to avoid alerting IT personnel about issues that may be resolved by the auto-recovery process (e.g., retries) that is inherit in the design of the wireless system.

What is needed is a system that can determine which occurrences of SLE deterioration would be resolved by the auto-recovery mechanism inherit in the wireless system and which occurrences of SLE deterioration may require human and/or IT intervention and as such should be reported to IT personnel and/or IT support as soon as possible.

SUMMARY

One exemplary aspect describes methods for determining normal SLE behavior, determining when a SLE exhibits abnormal deterioration, and taking an action to mitigate the abnormal SLE.

Constructing a Predictive Model for SLE

A network management system in accordance with one exemplary aspect monitors indicators of SLE as well as monitoring the system level experience of users. This monitoring can be continuous in nature or performed at some appropriate interval. For example, the network management system may monitor the connect time, throughput, coverage, capacity, roaming, success to connect for each wireless device, and/or one or more network parameters such as AP availability, etc. When a specific monitored parameter either which is either lower or higher than the accepted range or value, the system can identify the parameter as an indication or an occurrence of a poor SLE. A poor SLE for a specific mobile device may be, and often is, determined if the power received by the device from an AP is below first threshold, or if the power received from a device by an AP is below a specific second threshold. Similarly, a low SLE may be, and often is, determined when the number of reconnect attempts by a specific AP exceed a specific third threshold.

A system in accordance with one exemplary aspect utilizes a multi-variable time-series predictive model (MVT-SPM) to detect SLE anomalies. The system constructs a multi-dimensional SLE status vector (SLESV):

$$SLESV = [P1, P2, Pn] \qquad \text{Eq. 1}$$

Where:
SLESV—system level experience status vector
P1—first SLE element
P2—second SLE element
Pn—$n^{th}$ SLE element In accordance with a first embodiment, the elements of SLESV comprise SLE related parameters measured within a time period, e.g., within one hour (however any time period can be used based for example on the operating environment).

For example, the elements of the SLESV can comprise (but are not limited to):

$$SLESV = [P1, P2, \ldots, P9, P10] \qquad \text{Eq. 2}$$

Where:
P1—number of clients failing to connect to the network
P2—number of clients successfully connecting to the network
P3—number of clients that failed authentication
P4—number of clients that failed to associate
P5—number of clients that failed to get IP address from DHCP server
P6—number of clients that failed for unknown reason
P7—number of unique clients
P8—number of unique clients that failed to connect to network
P9—day of the week
P10—hour in the day
P9 (day of the week) and P10 (hour in the day) are examples of seasonal parameters. Those skilled in the art would recognize that other seasonal parameters such as the specific day in a month or month in the year, or other seasonal parameters may be collected as well. It is also to be appreciated that any combination of one or more of P1, P2, ..., P9, P10 can be used to determine the SLESV.

The terms user equipment (UE) and client are used throughout this document as examples of wireless equipment however the technology described herein is not limited thereto. In general, the technology described herein can be applicable and used with any type of electronic and/or communications system with a SLE.

In accordance with a second exemplary aspect, the elements of the SLESV comprise RSSI (Received Signal Strength Indication) measurements within a specific time period. Each client measures the RSSI of the signal it receives from the AP it is associated with to communicate with the network and periodically reports the RSSI to the network management system. The network management system may be located in the AP or on a dedicated server attached to the network.

The network management system monitors the values of the RSSI reported by all of the clients associated with a specific AP. More specifically, the network management system divides the RSSI range into bins. For example, assuming a RSSI between 0 and 100, the network management system may have 10 bins for counting the number of RSSI measurements within a specific time period (e.g., 1 hour) that fall within each RSSI bin. A first bin can be associated with 0<RSSI<=10, a second bin associated with 10<RSSI<=20, and so on.

In accordance with the second embodiment, the elements of the SLESV comprise RSSI bin counts measured within a time period, e.g., within one hour. For example, the elements of the SLESV comprise:

$$SLESV=[P1,P2, \ldots ,P9,P10,P11,P12] \quad \text{Eq. 3}$$

Where:
P1—number of 0<RSSI<=10 counts
P2—number of 10<RSSI<=20 counts
P3—number of 20<RSSI<=30 counts
P4—number of 30<RSSI<=40 counts
P5—number of 40<RSSI<=50 counts
P6—number of 50<RSSI<=60 counts
P7—number of 60<RSSI<=70 counts
P8—number of 70<RSSI<=80 counts
P9—number of 80<RSSI<=90 counts
P10—number of 90<RSSI<=100 counts
P11—day of the week
P12—hour in the day Equations 2 and 3 are provided for illustration only. Those skilled in the art will recognize that other elements and/or combinations of elements may be used to construct a SLESV. SLESVs are constructed by measuring SLE related indicators. A new SLESV can be obtained periodically, e.g., every 30 minutes, every hour or on some other basis. Assembled over a period of time, e.g., a year, the periodically constructed SLESVs yield a multivariate time-series (MTS) such as:

$$MTS=SLESV\ t1, SLESV\ t2, SLESV\ t3, SLESV\ t4, \quad \text{Eq. 4}$$

Where:
MTS—multivariate time-series
SLESV ti—system level experience status vector as described in Equations 1, 2, and 3 at time ti.

Accounting for Variability

Because the occurrences of SLE affecting events are independent, the values of each one of the elements of SLESVs, such as P1, P2, through Pn, depends on the starting time of the time window/period in which the measurements start. In other words, if one were to vary the starting time of the time window, i.e., the point of time in which the measurements start, one would have measured different values for the elements of each SLESV. For example, assume a system which measures SLESV within a one-hour time window. This system may determine that 13 clients failed to associate during the one-hour time window that started at 9:00 AM. However, the system may determine that only 7 clients failed to associate during the one-hour time window that started at 8:45 AM.

A system in accordance with one exemplary aspect removes the dependency on the starting time by accounting for the variability in the values of each one of the elements of the SLESV. To estimate the variability for each one of the elements, the system slides each measurement time window across different origin times and determines the maximum and minimum values of each element. For example, to determine the maximum and minimum values of the number of clients that failed to associate at 9:00 AM, the system determines the number of clients that failed to associate at the time windows between 8:30-9:30, 8:31-9:31, . . . , 9:00-10:00, . . . , 9:30-10:30. The system then determines the largest and smallest numbers of the clients which failed to associate.

The same process is repeated for each one of the elements of each SLESV within the MTS. The variability is used as an indicator for the confidence interval that the system expects to observe under normal operating conditions.

Augmented Service Level Experience Status Vector (ASLESV)

Once the maximum and minimum values for each one of the elements of each SLESV within the MTS are determined, the system creates an augmented service level experience status vector (ASLESV) by adding the maximum and minimum values as elements to the SLESV for each time window.

$$ASLESV=[P1,P1\ \text{max},P1\ \text{min},P2,P2\ \text{max},P2\ \text{min}, Pn,Pn\ \text{max},Pn\ \text{min}] \quad \text{Eq. 5}$$

Where:
ASLESV—augmented system level experience status vector
P1—first SLE element
P1 max—maximum first SLE element
P1 min—minimum first SLE element
P2—second SLE element
P2 max—maximum second SLE element
P2 min—minimum second SLE element
Pn—nth SLE element
Pn max—maximum nth SLE element
Pn min—minimum nth SLE element Multivariate Time-Series Predictive Model The MTS of SLESVs is used to construct a multivariate time-series predictive model (PM). In accordance with one aspect, a linear prediction model (LPM) is constructed. The LPM takes as an input the SLESV at time t and predicts the values of the elements of the ASLESV at time t+1. As such, assuming that the SLESV has n elements, the ASLESV has 3n elements and therefore the LPM is a n×3n matrix of the same dimension as the SLESV.

$$LPM = \begin{bmatrix} a_{11} & a_{12} & a_{13} \\ \ldots & \ldots & \ldots \\ a_{(3n)1} & a_{(3n)2} & a_{(3n)3} \end{bmatrix} \quad \text{Eq. 6}$$

Where:
LPM—linear prediction model, an n×3n matrix
ai j—the i-th, j-th element of the linear predictive model.

The predictive model is constructed by minimizing the prediction error over the whole multivariate time-series (MTS), i.e., minimize the error between the predicted ASLESV at time t(i+1) and the actual ASLESV at time t(i+1):

$$Et(i+1) = LMP*SLESV\ t(i) - ASLESV\ t(i+1) \qquad \text{Eq. 7}$$

Where:
E t(i+1)—prediction error vector at time t(i+1)
SLESV t(i)—system level experience status vector at time t(i)
LPM—linear prediction model vector, e.g., Eq. 6
LPM*SLESV t(i)—predicted value of the augmented SLESV at time t(i+1)
ASLESV t(i+1)—actual measured value of ASLESV at time t(i+1)

In accordance with yet another aspect, the system uses a Recurrent Neural Network such as BiLSTM (Bidirectional Long Short-Term memory) to create a prediction model for ASLESV t(i+1) based on the actual SLESVs at times prior to t(i+1). The specific predictive model is not essential to implementing the technology disclosed herein as other predictive models can be utilized as well with comparable success.

As is to be appreciated, other multivariate forecasting models can be used with the technologies discussed herein. In general, one exemplary aspect uses a multivariate forecasting model to predict whether an SLESV is a normal observation or is a result of some anomalous behavior in the network indicating an underlying problem which necessitates a manual intervention by an IT professional and/or an automated corrective measure.

Once the predictive model (e.g., linear model, model based on recurrent networks, or the like.) is constructed, an estimation of the ASLESV at time t(i+1) can be obtained by feeding the SLESV at time ti into the model:

$$SLESV\ t(i) \text{-->} PM \text{-->} \text{predicted ASLESV } t(i+1) \qquad \text{Eq. 8}$$

Where:
SLESV t(i)—actual SLESV at time t(i)
ASLESV t(i+1)—augmented SLESV at time t(i+1)
PM—predictive model The predictive model of Eq. 8 assumes that the model itself has the ability to maintain the history of the input SLESVs in its inner states.

Alternatively, the value of the predicted ASLESV at time t(i+1) is obtained by feeding multiple, e.g., 12, consecutive SLESVs into the predictive model to obtain a predicted ASLESV at time t(i+1):

$$[SLESV\ t(i-m), \ldots, SLESV\ t(i-1), SLESV\ t(i)] \text{-->} PM \text{-->} \text{predicted ASLESV } t(i+1) \qquad \text{Eq. 9}$$

Where:
SLESV t(i−m)—actual SLESV at time t(i−m)
[ . . . ]—consecutive SLESVs
ASLESV t(i+1)—augmented SLESV at time t(i+1)
PM—predictive model The predictive model of Eq. 9 assumes that the model does not have the ability to maintain the history of the input SLESVs in its inner states and therefore, consecutive multiple vectors need to be fed into the predictive model to obtain the prediction for the ASLESV at time t(i+1).

Whether the predictive model is constructed using Eq. 8 or 9, the parameters of the predictive model are adapted by feeding the input into the model, predicting the output at time t+1, and measuring the prediction error which is defined by:

$$Et(i+1) = \text{Predicted ASLESV } t(i+1) - \text{Actual ASLESV } t(i+1) \qquad \text{Eq. 10}$$

Where:
E t(i+1)—prediction error vector at time t(i+1)
ASLESV t(i+1)—value of ASLESV at time t(i+1)
and modifying the parameters of the predictive model as to minimize a measure of the prediction error.

In accordance with another aspect, the parameters of the predictive model are adopted so as to minimize the sum over time of the mean square of the prediction error. In this case the square root of the prediction error is given by:

$$PEi = SQRT[(Pi - \text{Pred } Pi)**2] \qquad \text{Eq. 11}$$

Where:
PEi—prediction error at time t+1 of the ith element of the ASLESV
SQRT—square root operator
Pi—i th measured ASLESV element at time t+1
pred Pi—predicted value of i th ASLESV element In accordance with yet another exemplary aspect, the prediction error that is used to adopt the parameters of the predictive model is based on a composite error of all of the predicted elements of the ASLESV such as the root mean square of the difference between the predicted ASLESV and the measured ASLESV:

$$PE = SQRT[(P1 - \text{Pred } P1)2 + (P2 - \text{Pred } P2)2 +, \ldots + (Pn - \text{Pred } Pn)**2] \qquad \text{Eq. 12}$$

Where:
PE—prediction error measure at time t
SQRT—square root operator
Pi—i th SLE element of an ASLESV
Pred Pi—predicted value of i th ASLESV element Regardless weather the prediction error is based on a single element of the ASLESV such as described by Eq. 11, or based on a composite measurement of the ASLESV such as the one described in Eq. 12, the adaptation of the parameters is made over time so as to minimize the overall error measurement over the whole multivariable time series of the SLESVs. The minimization can be made so as to reduce the sum of the absolute values of the errors or to minimize the square root or the sum of the errors.

Classification of Poor SLE

Once the SLE predictive model is constructed and the confidence interval with respect to the origin of the measurement time window is estimated, the system is ready to be deployed in an operational environment to classify events of poor SLE. Specifically, the system is ready to determine which poor SLE event is "normal" and as such would be resolved by the auto-recovery process, and which poor SLE event would require a more intrusive or manual intervention to be resolved.

In operation, the system monitors, either continuously or at some predetermined time, and measures SLE elements within a time window. The starting time of the time window/period can be set arbitrarily since the system can account for variations in the starting time. The measured SLE elements are used to construct SLESV for each measurement time window/period. The SLESVs are used as an input into the predictive model (PM) resulting in a predicted ASLESV at the output of the predictive model. The prediction of the next ASLESV is done in accordance with Eq. 8 or Eq. 9 above.

Once the next SLESV is measured, an ASLESV is constructed and compared against the predicted ASLESV, the prediction error is determined in accordance with Eq. 10. In according to one specific embodiment, this prediction error is then used to adapt the parameters of the prediction model.

For each measured parameter of the SLESV, the system compares the measured value against the predicted values of the ASLESV. More specifically, the system determines if the measured value falls within the minimum and maximum values of the specific parameter in the predicted ASLESV.

$$\text{Predicted } Pi \text{ min} < \text{Measured } Pi < \text{Predicted } Pi \text{ Max} \qquad \text{Eq. 13}$$

Where:
Predicted Pi min—predicted Min value of parameter Pi of ASLESV
Measured Pi—measured value of parameter Pi of SLESV
Predicted Pi Max—predicted Max value of parameter Pi of ASLESV If the system determines that the measured value of an SLESV parameter falls within the Min and Max values of the predicted parameters of the ASLESV, the system determines that the SLE is either good or alternatively that it is poor, but still within normal operating boundaries and auto-recovery should take care of this occurrence of poor SLE.

However, if it is determined that the measured SLESV parameter is either smaller than the predicted Min value of the ASLESV parameter, or greater than the predicted Max value of the ASLESV parameter, the network management system, e.g., SLE anomaly detection and management engine, determines that the system suffers from poor SLE that required a more intrusive or a manual intervention of IT technician. Alternatively, the system may invoke one or more of the aspects of the system described in the related U.S. patent application "METHODS AND APPARATUS FOR FACILITATING FAULT DETECTION AND/OR PREDICTIVE FAULT DETECTION," which sub classifies the root cause of the poor SLE and automatically invokes mitigation actions such as: changing channel, bandwidth and power level (triggering Radio Resource Management which is a component of the network management system), shut down or block a port to avoid a loop in the network, switch the broadcast to unicast to avoid broadcast storm (when there are too many address resolution protocol (ARP) requests), renew security certificate(s) of user devices (before they expire), configure the switch correctly, restart a switch, test cable and verify its integrity, disconnect a specific client, reboot an AP or other device, add the support of legacy security to fix the traffic congestion from old devices, re-initiate the AP's radio, stop or limit the guest portal access over high loading, restart a DHCP server, restart a AAA server, alert and IT technician, etc.

It should be noted that for some parameters the process checks only if the measured parameter of the SLESV is greater than the predicted maximum value of the predicted ASLESV. For example, the system may take an action only if the number of clients that are failing to connect is greater than 7. In another illustrative example, process checks only if the measured parameter of the SLESV is smaller than the predicted minimum value of the predicted ASLESV. For example, the system may take an action only if the measured RSSI of clients is smaller than 30. Those skilled in the art would recognize that in accordance with yet another exemplary aspect the system may take an action when a combination of different conditions on various parameters occurs such as, for example, the system takes action if:

$$[(\text{Measured } Pi > \text{Predicted } Pi \text{ max}) \text{ OR } (\text{Predicted } Pj \text{ min} > \text{Measured } Pj)] \text{ AND } (\text{Predicted } Pk \text{ min} > \text{Measured } Pk) \qquad \text{Eq. 14}$$

Numerous variations on the above described method and apparatus are possible and will be apparent in view of the detailed description which follows.

BRIEF DESCRIPTION OF THE FIGURES

The embodiments herein may be better understood by referring to the following description in conjunction with the accompanying drawings in which like reference numerals indicate identically or functionally similar elements, of which:

FIGS. 10a and 10b describe the exemplary internal tables used to determine the variability associated with each measurement.

FIGS. 11a-b illustrates an exemplary time-series of the measured values and the predicted values of ASLESV parameters, as well as the associated variability.

DETAILED DESCRIPTION

Figure 1:
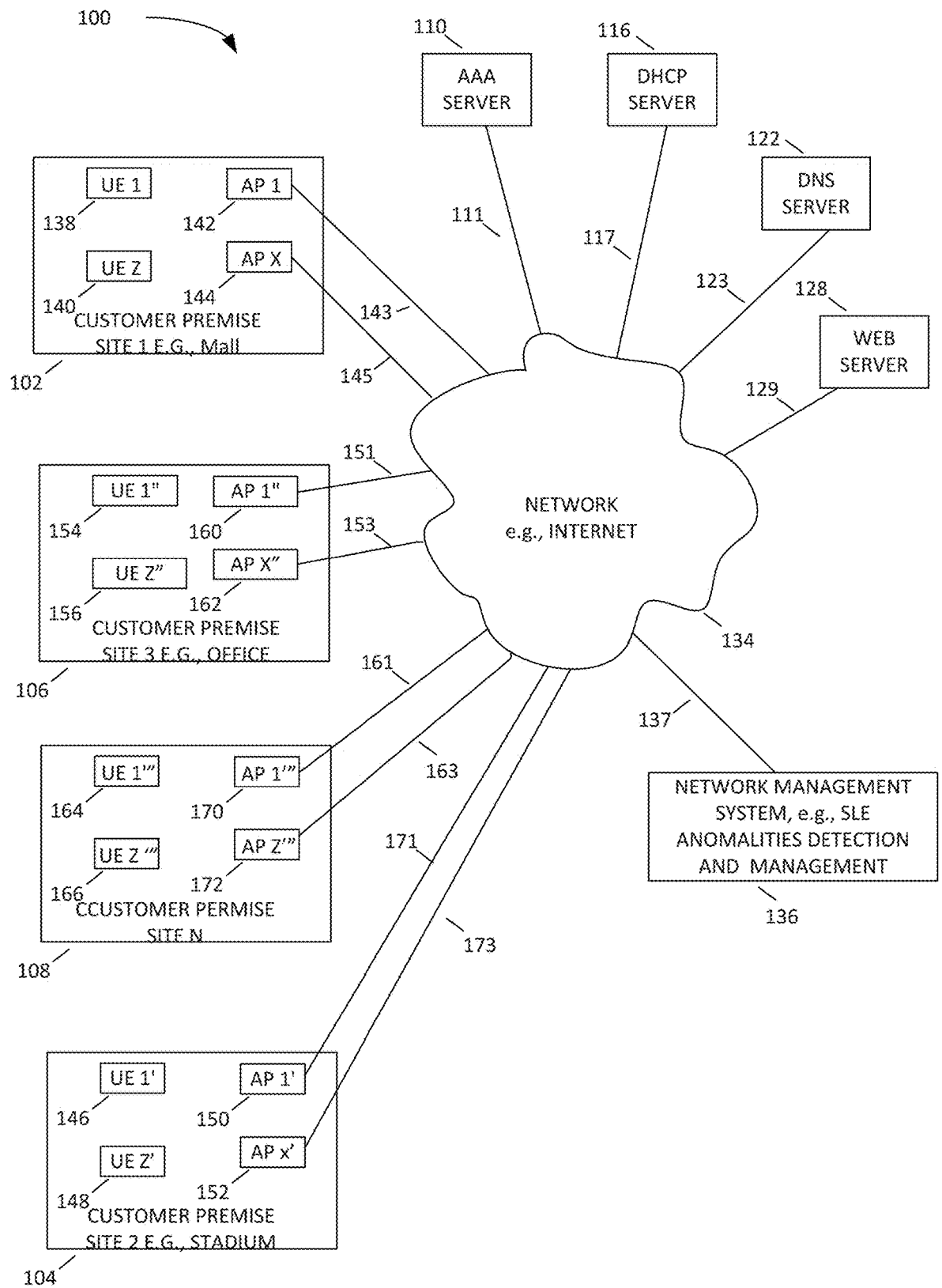
FIG. 1 is a block diagram illustrating an exemplary embodiment of a network environment.

FIG. 1 is a drawing of an exemplary system 100 implemented in accordance with an exemplary embodiment. Exemplary system 100 includes a plurality of access points (AP1 142, ..., AP X 144, AP 1' 150, ..., AP X' 152, AP 1 "160, ..., AP X" 162, AP V' 170, ..., AP X'" 172), a plurality of Authentication, Authorization and Accounting (AAA) servers (only one AAA server 110 is shown), a plurality of Dynamic Host Configuration Protocol (DHCP) servers (only one DHCP server 116 is shown), a plurality of Domain Name System (DNS) severs (only one DNS server 122 is shown), a plurality of Web servers (only one Web server 128 is shown), and a network management system (NMS) 136, e.g., an access point management system, which are coupled together via network 134, e.g., the Internet and/or an enterprise intranet and/or wired and/or wireless network. Network communications links (143, 145, 151, 153, 161, 163, 171, 173) couple the access points (AP1 142, AP X 144, AP 1' 150, AP X' 152, AP 1 "160, AP X" 162, AP 1'" 170, AP X'" 172), respectively, to network 134. Network communications link 111 couple the AAA servers (only AAA server 110 is shown) to network 134. Network communications link 117 couple the DHCP servers (only one DHCP server 116 is shown) to network 134. Network communications link 123 couple the DNS servers (only one DNS server 122 is shown) to network 134. Network communications link 129 couple the Web servers (only one Web server 128 is shown) to network 134. The exemplary system 100 further includes a plurality of user equipment devices (UE 1 138, . . . , UE Z 140, UE 1' 146, . . . , UEZ' 148, UE 1" 154, . . . , UE Z" 156, UE 1'" 164, UE Z'" 166). At least some of the UEs (138, 140, 146, 148, 154, 156, 164, 166) are wireless devices which may move throughout system 100.

In exemplary system 100, sets of access points are located at different customer premise sites. However, in general the APs can be located at any location. Customer premise site 1 102, e.g., a mall, includes access points (AP 1 142, . . . , AP X 144). Customer premise site 2 104, e.g., a stadium, includes access points (AP 1' 150, . . . , AP X' 152). Customer premise site 3 106, e.g., an office, includes access points (AP 1" 160, . . . , AP X" 162). Customer premise site N 108 includes access points (AP 1'" 170, . . . , AP X'" 172). As shown in FIG. 1, UEs (UE 1 138, . . . , UE Z 140) are currently located at customer premise site 1 102; UEs (UE 1' 146, . . . , UE Z' 148) are currently located at customer premise site 2 104; UEs (UE 1" 154, . . . , UE Z" 156) are currently located at customer premise site 3 106; and UEs (UE 1'" 164, . . . , UE Z'" 166) are currently located at customer premise site N 108.

Figure 2:
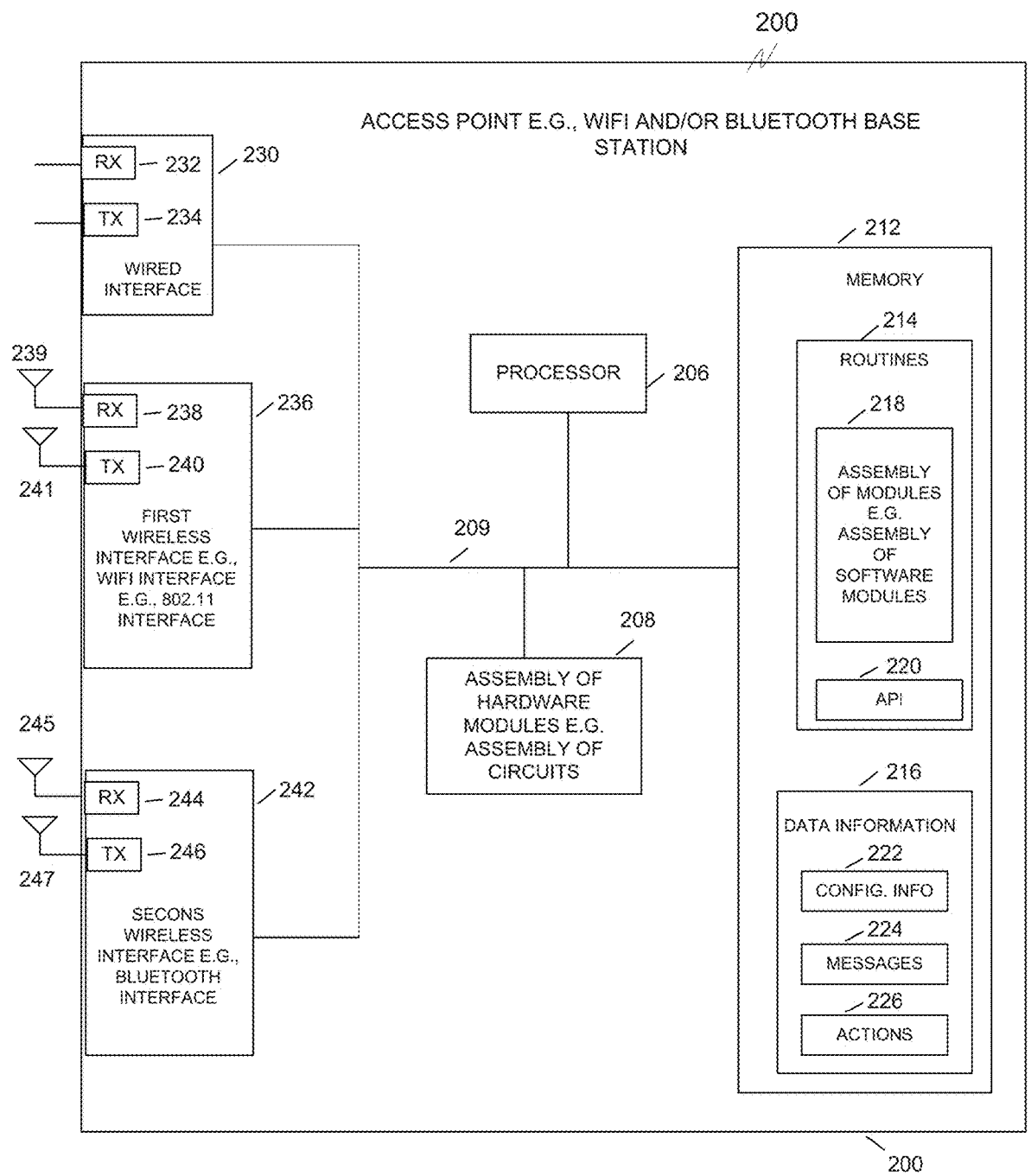
FIG. 2 is a block diagram illustrating an exemplary embodiment of wireless access point.

FIG. 2 illustrates an exemplary access point 200 (e.g., representative of any of access points AP 1 142, . . . , APX 144, AP 1' 150, APX' 152, AP 1" 1 160, . . . , APX" 162, AP 1'" 170, . . . , APX'" 172) in accordance with an exemplary embodiment.

Access point 200 includes wired interfaces 230, wireless interfaces 236, 242, a processor 206, e.g., a CPU, a memory 212, and an assembly of modules 208, e.g., assembly of hardware module, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interface 236 may support Wi-Fi interface, e.g., an IEEE 802.11 interface, and includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals.

The second wireless interface 242 may support Bluetooth® communications and includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 may store instructions for performing routines 214 and data/information 216. Routines 214 can include an assembly of modules 218, e.g., an assembly of software modules, and Application Programming Interfaces (APIs) 220. Data/information 216 can include configuration information 222, message event stream capture information 224 and a collection of remedial actions 226 to be taken in the case of the discovery of abnormal message flows.

Figure 3:
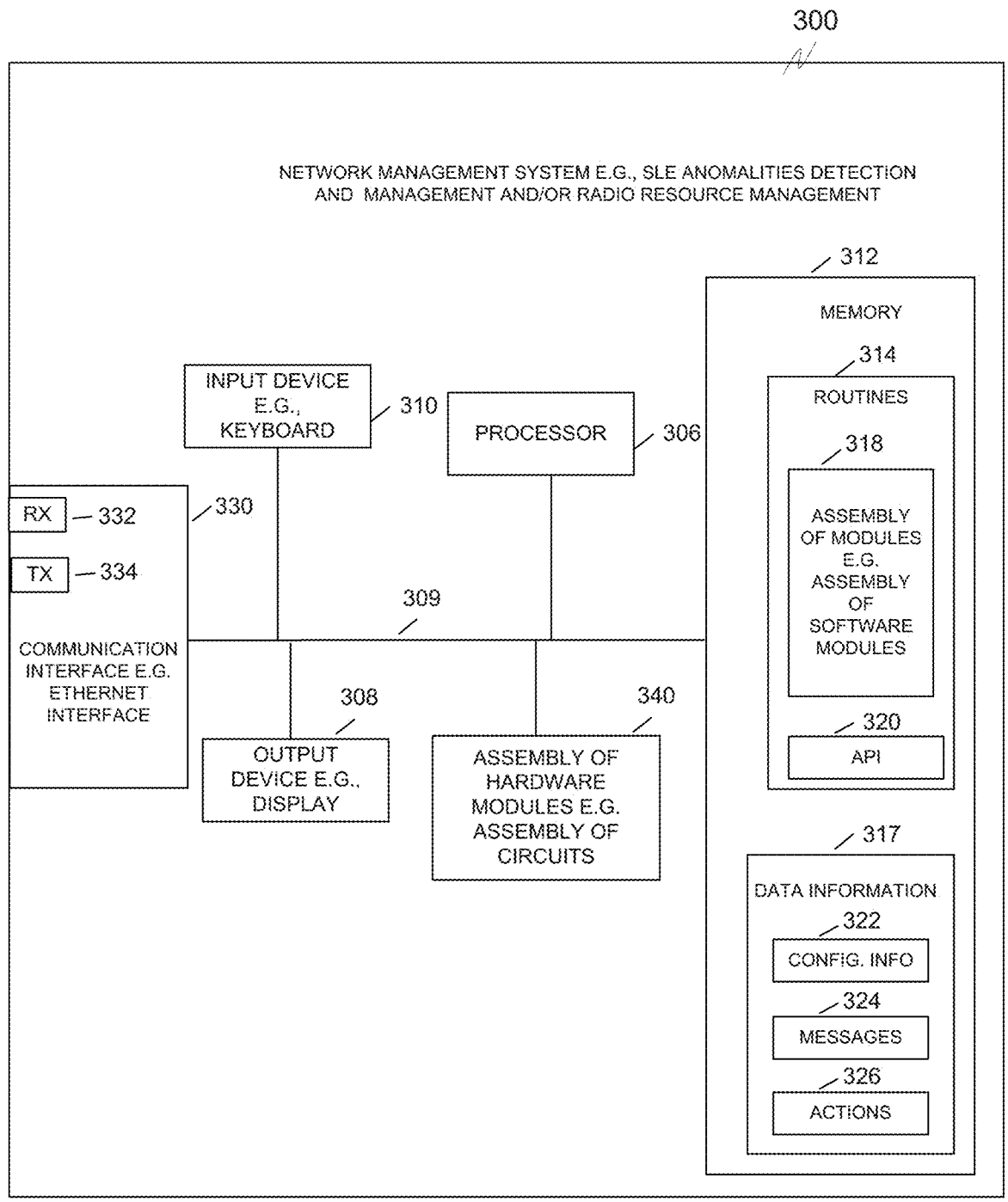
FIG. 3 is a block diagram illustrating an exemplary embodiment of network management system that determines which SLE deterioration would require manual intervention.

FIG. 3 illustrates an exemplary network management and monitoring system 300, e.g., a wireless system monitoring server, an access point management node, or the like, in accordance with an exemplary embodiment. In some embodiments, the network management and monitoring system 300 of FIG. 3 is the network management system (NMS) 136 of FIG. 1.

The network management and monitoring system 300 includes a communications interface 330, e.g., an Ethernet interface, a processor 306, an output device 308, e.g., display, printer, etc., an input device 310, e.g., keyboard, keypad, touch screen, mouse, etc., a memory 312 and an assembly of modules 340, e.g., assembly of hardware module, e.g., assembly of circuits, coupled together via a bus 309 over which the various elements may interchange data and information. Communications interface 330 couples the network management and monitoring system 300 to a network and/or the Internet. Communications interface 330 includes a receiver 332 via which the network monitoring system can receive data and information, e.g., including service related information, e.g., message streams, connection time information, and success/failure related information from access points, e.g., for radio connection establishment, AAA services, DHCP requests, Simple Notification Service (SNS) look-ups, and Web page requests, and the like. Communications interface 330 further includes transmitter 334, via which the network management and monitoring system 300 can send data and information, e.g., including configuration information and instructions, e.g., instructions to access points to restart, change transmission power, add SSID, etc.

Memory 312 includes instructions that perform routines 314 and data/information 317. Routines 314 include an assembly of modules 318, e.g., an assembly of software modules.

Memory 312 further includes routines 314 and data/information 317. Routines 314 include an assembly of modules 318, e.g., an assembly of software modules, and Application Programming Interfaces (APIs) 320. Data/information 317 includes configuration information 322, captured message event stream information 324 and a collection of remedial actions to be taken in case of discovery of abnormal message flows 326. The memory 312 can further include and store the predictive model (PM) which is computed by the NMS and used in predicting the ASLESV based on the measured SLESV(s).

The remedial actions may be configured by the system administrator based, for example, on past experience. In accordance with some aspects, the remedial actions may be downloaded to specific APs. In accordance with other embodiments, the remedial actions are automatically invoked when an abnormal SLE parameter or a combination of parameters detects a condition of SLE degradation.

Figure 4:
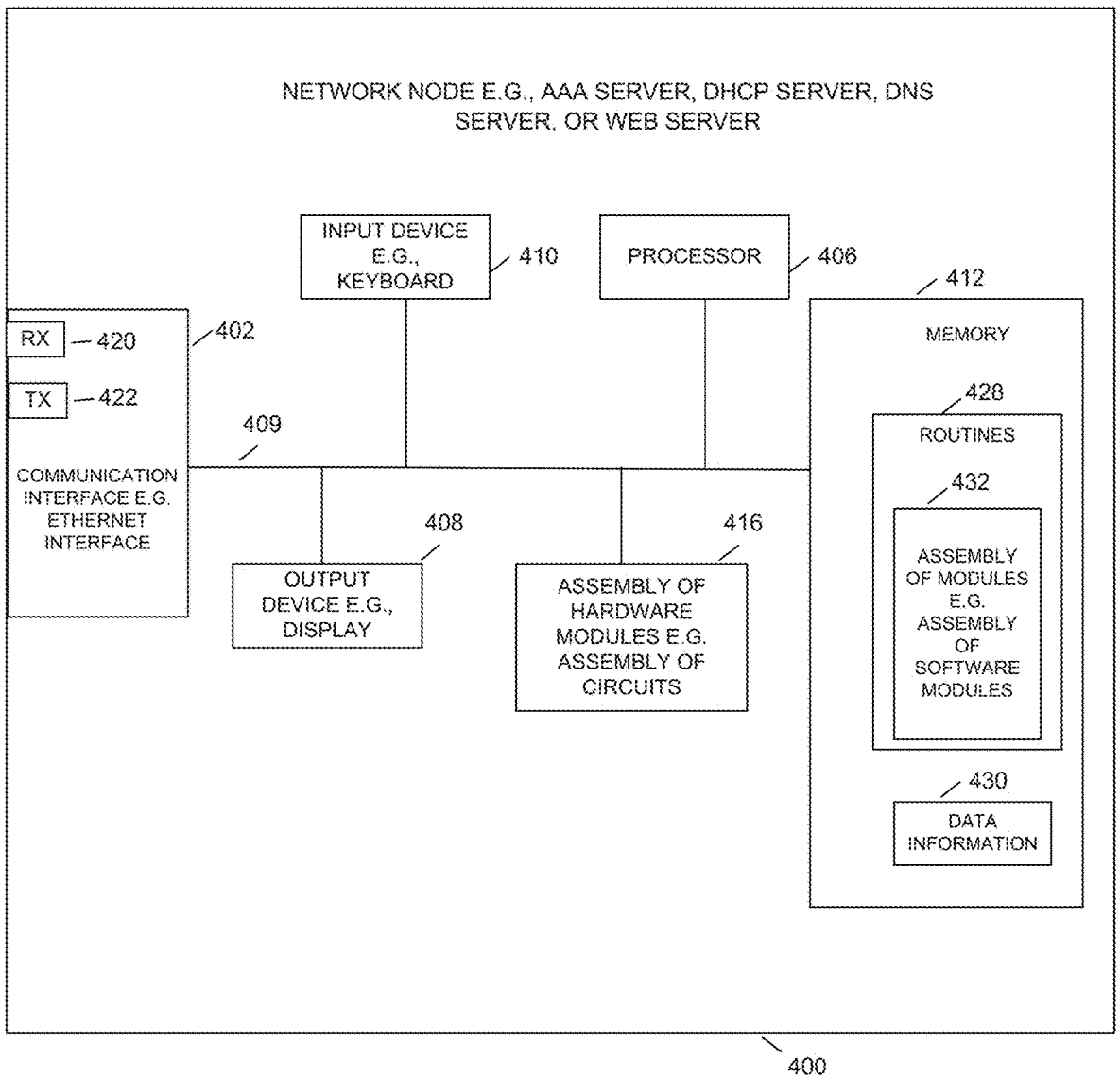
FIG. 4 is a block diagram illustrating an exemplary embodiment of network node server.

FIG. 4 illustrates an exemplary node server 400, e.g., AAA server, DHCP server, DNS server, Web server, etc. In some embodiments, node server 400 of FIG. 4 is server 110, 116, 122, 128, of FIG. 1. Node server 400 includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of modules 416, e.g., assembly of hardware module, e.g., assembly of circuits, coupled together via a bus 409 over which the various elements may interchange data and information. Communications interface 402 couples the node server 400 to a network and/or the Internet. Communications interface 402 includes a receiver 420 via which the node server can receive data and information, e.g., including operation related information, e.g., registration request, AAA services, DHCP requests, Simple Notification Service (SNS) look-ups, and Web page requests, and a transmitter 422, via which the node server 400 can send data and information, e.g., including configuration information, authentication information, web page data, etc.

Memory 412 includes routines 428 and data/information 430. Routines 428 include assembly of modules 432, e.g., an assembly of software modules and data information 430.

Figure 5:
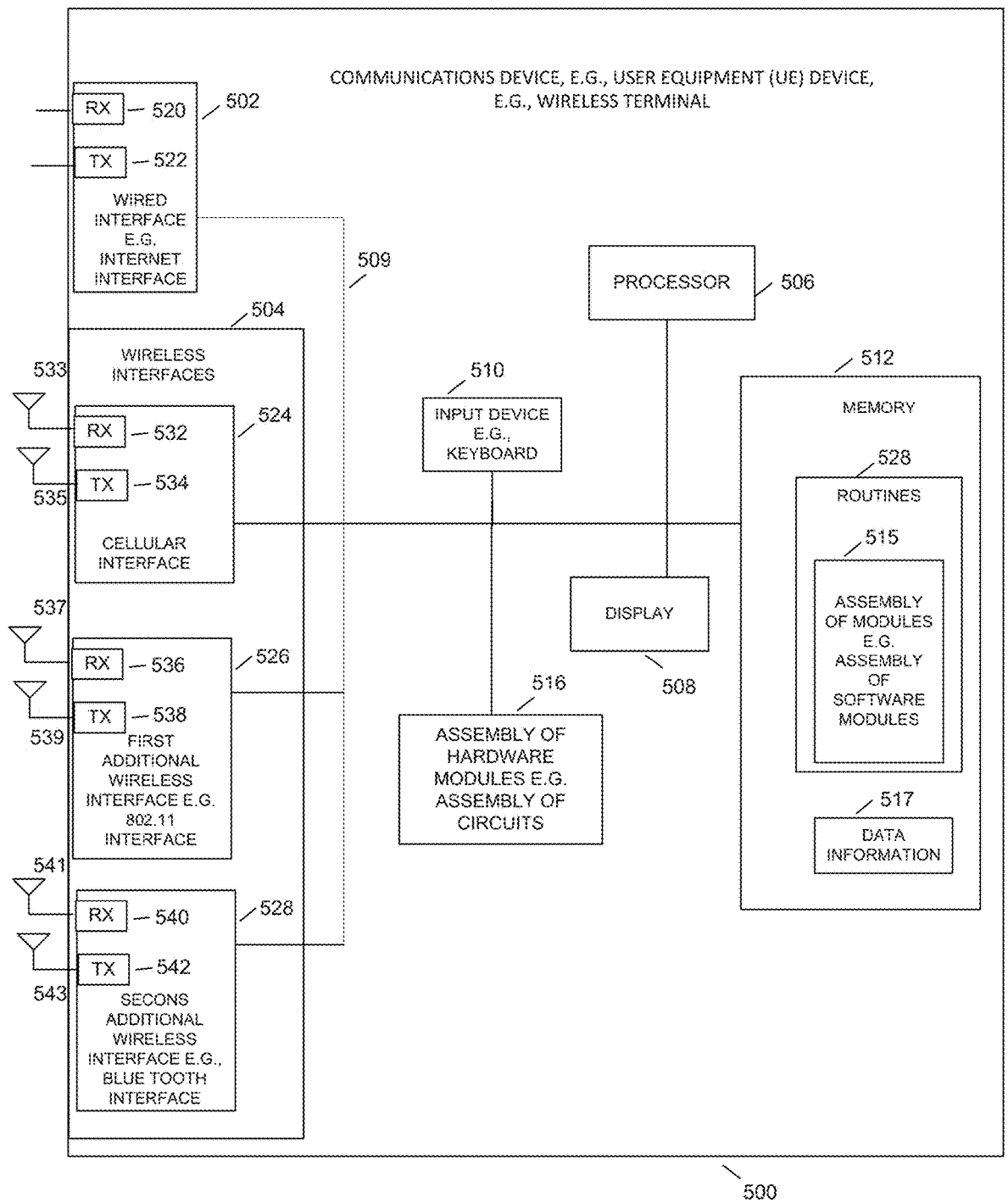
FIG. 5 is a block diagram illustrating an exemplary embodiment of communication device, such as UE.

FIG. 5 is a drawing of an exemplary client such as UE 500 (e.g., user equipment UE 1 138, . . . , UE Z 140, UE 1' 146, . . . , UE Z' 148, UE 1'' 154, . . . , UE Z'' 156, UE 1''' 164, . . . , UE Z''' 166) in accordance with an exemplary embodiment.

UE 500 includes wired interfaces 502, wireless interfaces 504, a processor 506, e.g., a CPU, a memory 512, and an assembly of modules 516, e.g., assembly of hardware module, e.g., assembly of circuits, coupled together via a bus 509 over which the various elements may interchange data and information. Wired interface 502 includes receiver 520 and transmitter 522. The wired interface couples the UE 500 to a network and/or the Internet 134 of FIG. 1.

The wireless interface 504 includes cellular interface 524, first wireless interface 526, e.g., IEEE 802.11 Wi-Fi interface, and a second wireless interface 528, e.g., Bluetooth® interface. The cellular interface 524 includes a receiver 532 coupled to receiver antenna 533 via which the access point may receive wireless signals from access points, e.g., AP 1 142, . . . , APX 144, AP 1' 150, APX' 152, AP 1'' 1 160, . . . , APX'' 162, AP 1''' 170, . . . , APX''' 172, and transmitter 534 coupled to transmit antenna 535 via which the access point may transmit wireless signals to APs, e.g., AP 1 142, . . . , APX 144, AP 1' 150, APX' 152, AP 1'' 1 160, . . . , APX'' 162, AP 1''' 170, . . . , APX''' 172. The first wireless interfaces 526 may support a Wi-Fi interface, e.g. IEEE 802.11 interface, and include receiver 536 coupled to receive antenna 537, via which the UE may receive wireless signals from communications devices, e.g., APs, and the transmitter 538 coupled to transmit antenna 539 via which the UE may transmit wireless signals to communications devices, e.g., APs.

The second wireless interface 528 may support Bluetooth® communications which includes receiver 540 coupled to receive antenna 541, via which the UE may receive wireless signals from communications devices, e.g., APs, and transmitter 542 coupled to transmit antenna 543 via which the UE may transmit wireless signals to communications devices, e.g., APs.

Memory 512 includes instructions for routines 528 and data/information 517. Routines 528 include assembly of modules 515, e.g., an assembly of software modules. Data/information 517 may include configuration information as well as any additional information required for normal operations of UE 500.

Figure 6:
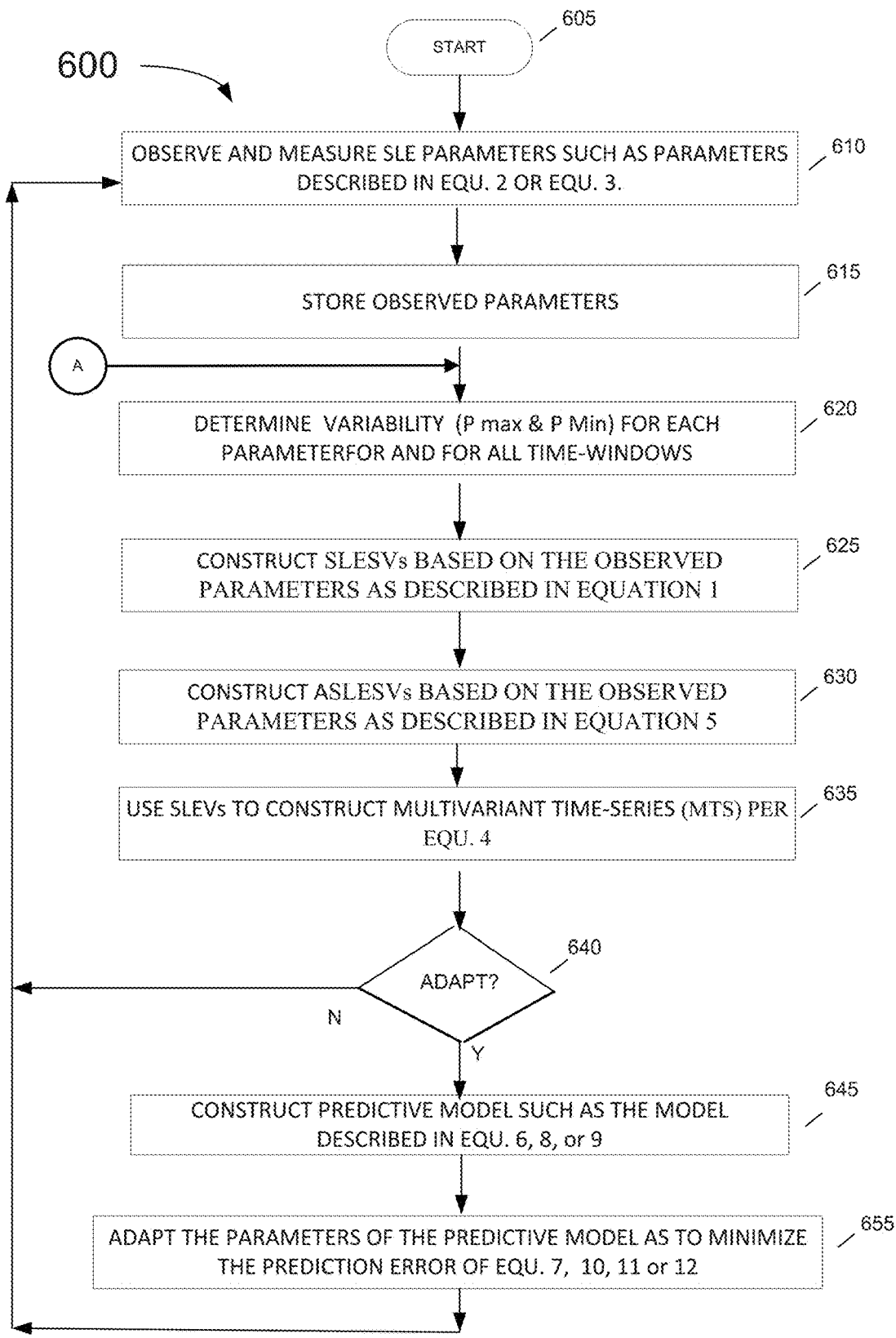
FIG. 6 is a flowchart illustrating an exemplary embodiment of a process for constructing the predictive model for predicting ASLESVs.

FIG. 6 is a flowchart illustrating an exemplary method 600 for constructing the predictive model for predicting ASLESV parameters. The process starts in step 605 and proceeds to step 610 where the system observes and measures SLE parameters such as the parameters described in equations 2 and 3. In one embodiment, the measurements of the SLE parameters are performed in the access points such as AP1-APX, AP'-APX', AP1''-APX'', and AP1'''-APX''' of FIG. 1. In another embodiment, SLE related information is passed to network management server, such as server 136 of FIG. 1, for further processing.

The process proceeds to step 615 where the system stores the measured parameters in internal memory such as memory 312 of FIG. 3. In accordance with one illustrative example, the parameters are stored in tables such as those illustrated in FIGS. 10a and 10b.

Next, in step 620 the process determines the variability of the measured parameters with respect to the starting time as described in greater detail below with reference to FIGS. 8 and 9.

The process continues to step 625 where the system constructs SLESVs based on the observed SLE parameters. Examples of SLESVs are provided in equations 1, 2, and 3. The process then proceeds to step 630 where the system constructs ASLESVs based on the observed parameters as described in equation 5. More details regarding obtaining the parameters of ASLESV is described below with reference to FIGS. 10a and 10b.

The process continues to step 635 where the SLESVs which were constructed in step 625 above are used to construct multivariate time-series as described in equation 4. An illustrative graphical example of such multivariate time-series is provided in FIG. 7.

Figure 7:
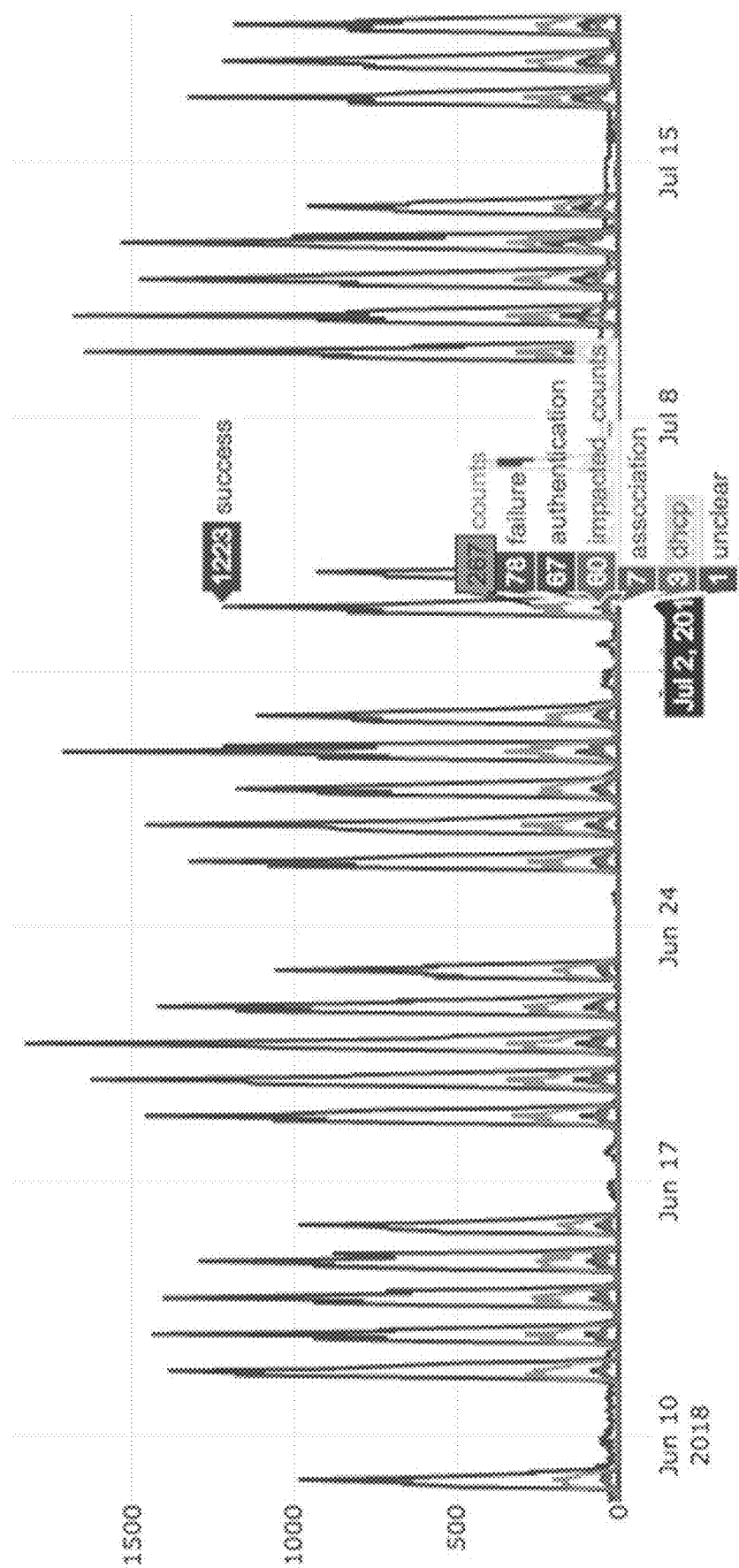
FIG. 7 is an example of a multivariate time series of SLESVs.

For example, and with reference to FIG. 7, at a specific time the SLESV parameters could comprise 1223 successful connections to the Wi-Fi network, 267 clients, 78 failed connections, 67 failures due to authentication issues, 60 impacted clients, 7 clients failing to connect due to association issues, 3 failed connections due to DHCP issues, and one connection failure for which the root cause is not clear.

In step 640 the system determines if it should construct the predictive model and adapt its parameters. In accordance with one exemplary strategy, the system is programmed to re-train and update the parameters periodically e.g., once a week, once a month, once per year etc. During this period of time, the method loops back to step 610 where it continues to observe and store SLE parameters, construct SLESVs and ASLESVs to be used in the process of adaptation of the parameters of the predictive model. In accordance with another exemplary strategy, the system may be programmed to continuously adapt the parameters of the predictive model as soon as a new SLESV and ASLESV vectors are measured and constructed.

In accordance with yet another exemplary embodiment, the process triggers a new predictive model parameters adaptation when process determines that the error between the measured SLESV parameters and the predicted values exceeds a predetermined threshold for a predetermined duration, e.g., 7 days.

When step 640 determines that the parameters of the predictive model need to be adapted, the process proceeds to optional step 645 where a new predictive model is constructed, capable of predicting ASLESV at time t+1 based on SLESVs at times t and prior times. The prediction model can be a linear prediction model such as the one described in equation 6 or a non-linear prediction model such as the one described in equations 8 or 9. Step 645 is performed only once and then in the following cycles this step can be skipped as its parameters can be reused in consecutive parameter adaptation cycles. One exemplary process of constructing the prediction model can comprise, but is not limited to, determining the number of parameters in the model, determining the structure of the model, initializing the parameters of the model to random numbers, initializing the parameters of the predictive model by copying the values from, e.g., another related predictive model, etc.

The process continues to step 655 where the parameters of the predictive model are adapted so as to minimize the prediction error. In one specific example, the adaptation of the predictive model parameters is performed to minimize the square root of the sum of all of the prediction errors squared. Examples of prediction error are provided by equations 7, 10, 11 and 12.

The process of constructing the predictive model then loops back to step 610 and the predictive model is updated either periodically or continuously based on the ongoing measurements of the SLE parameters. In accordance with yet another embodiment, the process of constructing the predictive model and refining its parameters ends once it is determined that the additional parameter adaptation does not change the parameters or the prediction error by more than a pre-determined threshold.

Figure 8:
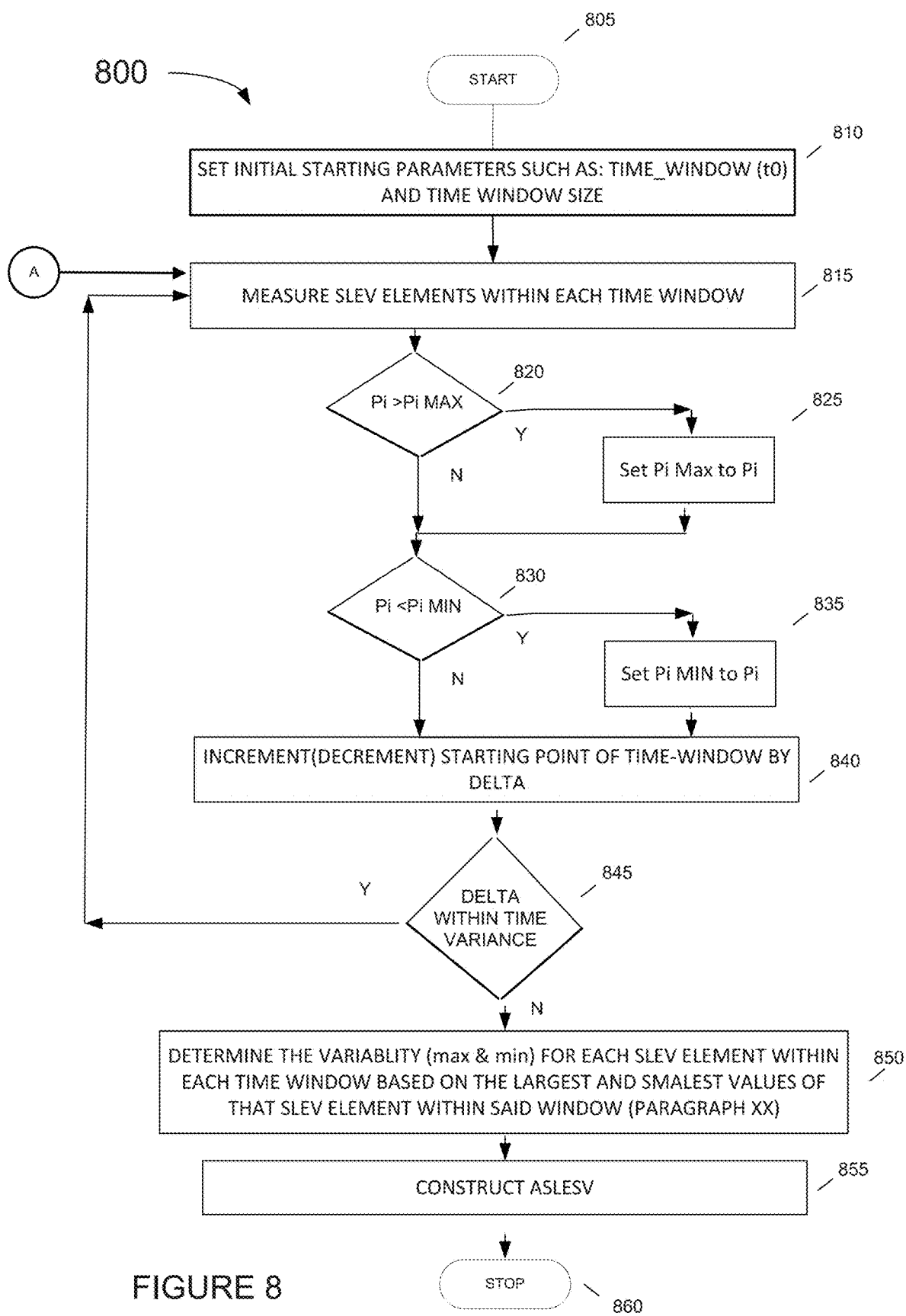
FIG. 8 is a flowchart illustrating an exemplary embodiment of a process for estimating the variability of the predicted SLESV.
Figure 9:
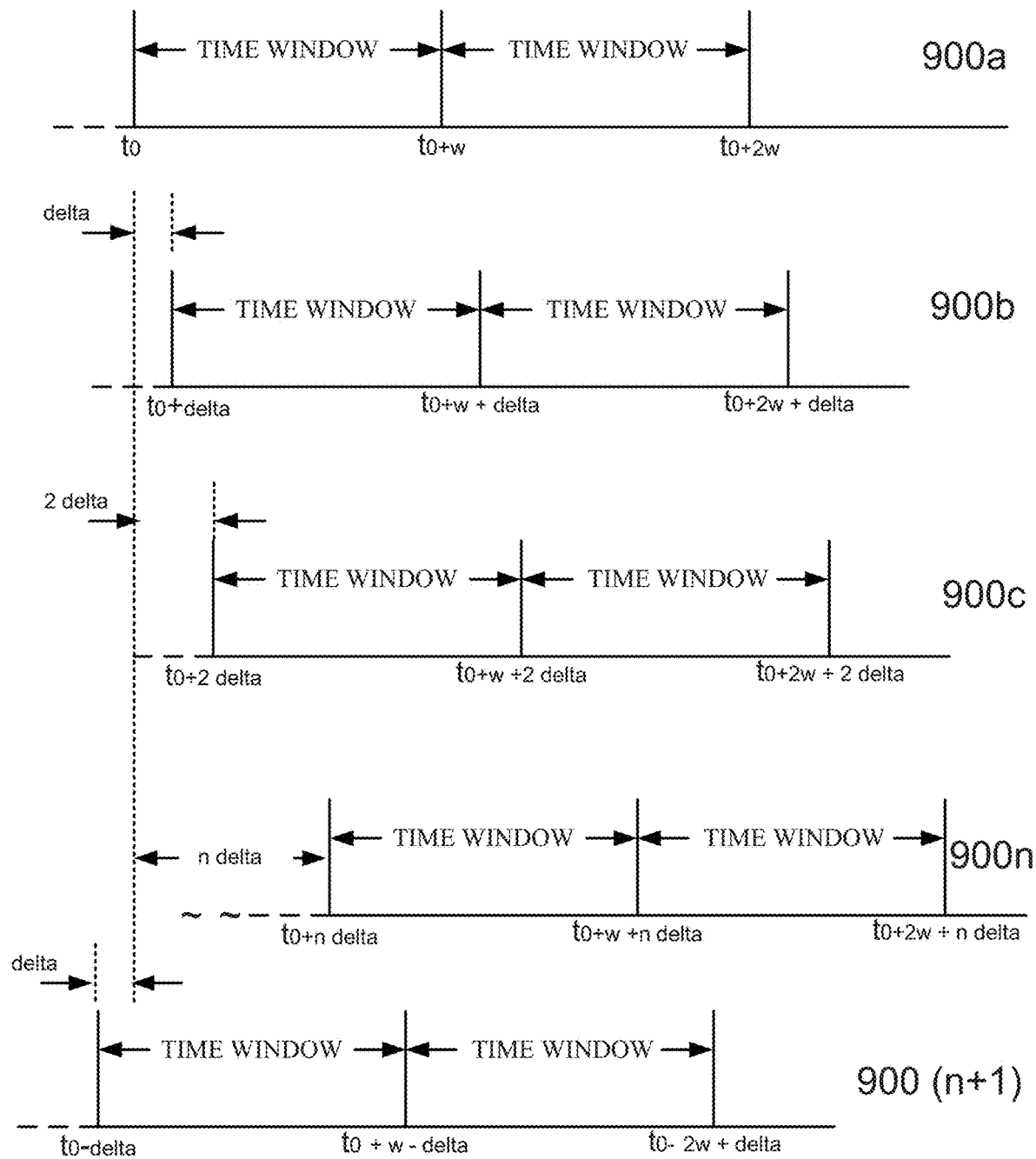
FIG. 9 illustrates exemplary time windows used to measure the variability associated with each measured SLESV parameter value.

FIG. 8 is a flowchart illustrating an exemplary method 800 for determining the variability associated with each one of the SLESV parameters at any given time. The specific values of each SLESV parameter/element depend on the specific starting point in time t0 wherein the time-window is set to start. For example, referring to FIG. 9, the SLESV parameters measured within time-windows 900a would be different than the SLESV parameters measured within time-window 900b which starts delta seconds later or within time-window 900(n+1) which starts delta seconds earlier.

Exemplary process 800 starts at step 805 and continues to step 810 where initial time-window parameters such as starting point t0, window duration, starting time increment delta, and a threshold for varying the starting time of the time windows are determined. These values may be determined and set into memory by the programmer of the system or alternatively, may be entered as parameters by the data scientist or the technical person managing or operating the system.

Once the initial parameters of the system are determined in step 810, the method proceeds to step 815 where the system measures and stores the SLESV parameters/elements that are measured in each time window. An example for such multivariate time-series is illustrated in FIG. 7. The measured and observed SLESV parameters are stored in a table such as the one illustrated in FIG. 10a. In the first iteration through step 820, only the exemplary initial parameters of the table in FIG. 10a exist and as such the process sets Pi Max in step 825 to the values of the corresponding measured SLE parameters Pi within each time window.

Similarly, in the first iteration through step 830, only the exemplary initial parameters of the table in FIG. 10a exist and as such the process sets Pi Min in step 835 to the values of the corresponding measured SLE parameters Pi within each time window. These initial (exemplary) parameter assignments are shown in FIG. 10a.

The process proceeds to step 840 where a new starting time point is set either by incrementing or decrementing the starting time point by delta seconds. In step 845 the method determines whether the new starting time of the window is still within the threshold for varying the starting time of the time windows. If it is, then the method loops back to step 815 where the system measures the SLESV parameters/elements in each new time window that have a different starting point than the previous time window. An example of these measurements is illustrated in FIG. 10b. For each new time window, the system measures the SLESV parameters P1' through Pn'. Those skilled in the art should recognize that the parameter Pi' in each time window can be different (though for simplicity of illustration the different time indices were dropped.).

The method proceeds to step 820 where for each parameter in each time window the system determines whether the new measured parameter Pi' is greater than the corresponding stored Pi Max. When the system determines that the new Pi' is greater than the corresponding stored P Max, the method proceeds to step 825 where the new measured Pi' is set to be the Pi Max. For example, as illustrated in FIG. 10b, in the first window P1' and P3' as well as in the second time window P2' are determined to be greater than the stored value and as such they are set to be the new relevant Pi Max.

Similarly, in step 830 for each parameter in each time window the system determines whether the new measured parameter Pi' is smaller than the corresponding stored Pi Min. When the system determines that the new Pi' is smaller than the corresponding stored P Min, the method proceeds to step 835 where the new measured Pi' is set to be the Pi Min. For example, as illustrated in FIG. 10b, in the first window P2', in the second time window P3', as well as in the third window P2' and P3' are determined to be smaller than the stored value and as such they are set to be the new relevant Pi Min.

The method continues to loop through steps 815, 820, 825, 840 and 845 until the shift of the starting point of the time windows covers the desired time period. This time duration is based on the threshold for varying the starting time of the time windows which was set in the initial step 810.

Once the whole range of starting time t0 is covered the method moves to step 850. For example, FIG. 9 shows that the time period covers times up to t0+n delta where n is a predetermined number. A similar time period can be used to shift the starting time backwards up to t0-n delta (not shown in the figure). In step 850 the method determines the variability of each parameter, specifically, determines the value of the corresponding Pi Max and Pi min for each SLESV parameter in each time-window based on the values set in previous steps.

The method proceeds to step 855 wherein the ASLESVs for each time period are constructed using the corresponding values of Pi min and Pi max for each parameter in each time window. Equation 5 illustrated the use of the corresponding Pi min and Pi Max for constructing the ASLESVs. The method ends at step 860.

FIG. 11a shows a on example of a time-series of the number of measured and an estimated number of impacted users. The gray area 1105 in the figure illustrates the variability estimated by equation 8 or 9 as part of estimating the Pi max and Pi min associated with ASLESV parameters. Similarly, FIG. 11b shows a time-series of the measured and estimated number of failures to connect to the network and the gray area 1105 indicating the estimated variability.

Figure 12:
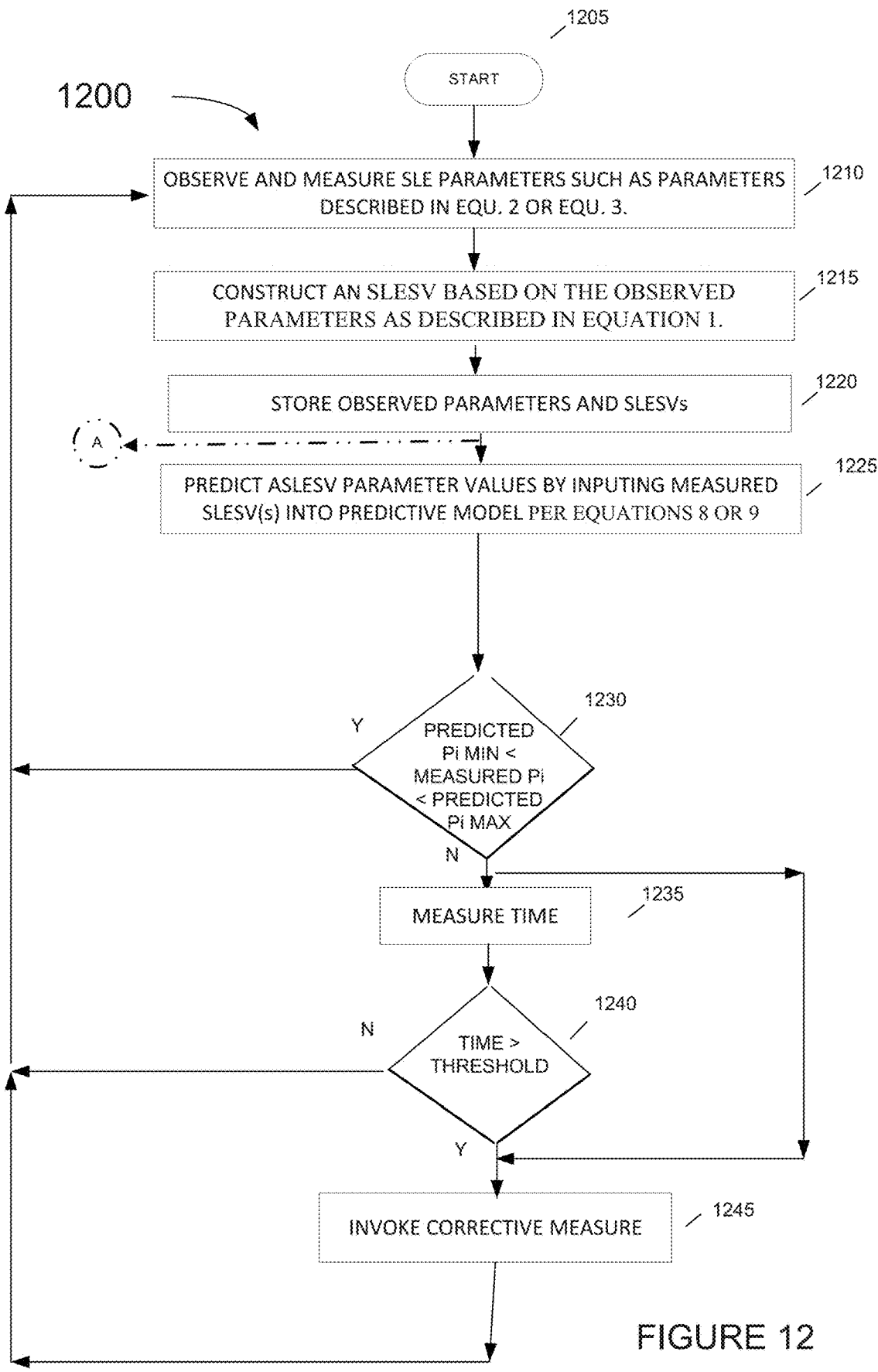
FIG. 12 is a flowchart of an exemplary method of using the prediction model including the variability in a process of determining when corrective action should be taken by a system administrator or an IT technician.

FIG. 12 illustrates an exemplary method for utilizing the predictive model and the estimated variability to determine which SLE deterioration would necessitate automated intervention by the system and/or a manual intervention by an IT technician and which SLE deterioration is within norm and should take care of itself.

The method starts at step 1205 and proceeds to step 1210 where the system observes and measures SLE parameters such as those described in equations 2 and 3.

The observed and measured parameters are used to construct, in step 1215, SLESV vectors such as the vector described in equations 1, 2, and 3, and in FIG. 7.

The process continues to optional step 1220 where the SLESVs are stored for future use. Specifically, if the system uses a predictive model which incorporates in its internal states the history of the measured SLESVs at its input, the SLESV are fed directly (and without a need to store them) as an input into the predictive model, in step 1225, producing an estimated value for the next ASLESV. However, if the system uses a predictive model that does not incorporate in its internal states information about the previous SLESVs, then in step 1220, the process stores previous SLESVs to product the multivariate time-series of previous SLESVs. This MTS is fed as an input into the predictive model as described in equation 9 producing an estimated value for the next ASLESV.

In either case, step 1225 produces an estimation for the next ASLESV based on the previous measured SLESV(s). The method proceeds to step 1230 where each one of the measured SLESV is compared against the predicted Pi Min and Pi Max. If step 1230 determines that the value of the measured Pi is greater than the predicted value Pi Min of the ASLESV, and that the measured value Pi is smaller than the predicted value Pi Max of the ASLESV, the method loops back to step 1210. However, if the actual measured value Pi is determined to be larger than the predicted value Pi Max of the corresponding ASLESV parameter, or that actual measured value Pi is determined to be smaller than the predicted value Pi Min of the corresponding ASLESV parameter, then according to one embodiment the method proceeds to optional step 1235. In accordance with second embodiment, the system proceeds directly to step 1245.

In accordance with the exemplary first embodiment, the process continues to step 1235 where the time duration that a specific measured Pi is either: smaller than the predicted value of Pi Min in the ASLESV, or the time that the specific measured Pi is larger than the predicted value of that Pi Max in the ASLESV. This time duration is compared in step 1240 with a predetermined threshold. If the time duration is greater than the predetermined threshold the process continues to step 1245 where the system takes a corrective action such as notifying an IT technician and advising them that corrective action needs to be taken, restarting a DHCP server, restarting an AAA server, and/or other appropriate corrective action such as automatically invoking mitigation actions such as: changing channel, bandwidth and power level (triggering radio resource management which is a component of the network management system), shut down or block a port to avoid a loop in the network, switch the broadcast to unicast to avoid broadcast storm (when too many ARP requests), renew user device's certificates (before they expire), configure the switch correctly, restart a switch, test cable and verify its integrity, disconnect a specific client, reboot an AP, add the support of legacy security to fix traffic congestion from old devices, re-initiate the AP's radio, stop or limit the guest portal access over high loading, restart a DHCP server, restart an AAA server, alerting an IT technician or an IT administrator, etc., or the like, as appropriate based on the network environment.

However, if the method determines in step 1240 that the duration that the measured value of the SLESV parameter is greater than the predicted Pi max or smaller than the predicted Pi Min, for a time duration shorter than the predetermined threshold, the method loops back to 1210 without invoking the automated corrective measures.

Returning to step 1235, and in accordance with the second exemplary embodiment, when the measured value Pi is either: smaller than the corresponding predicted value in the ASLESV, Pi Min, or the measured value Pi is greater than the corresponding predicted value in the ASLESV, Pi Max, the process proceeds directly to step 1245 where a corrective measure, as described above, can be taken immediately.

Figure 13A:
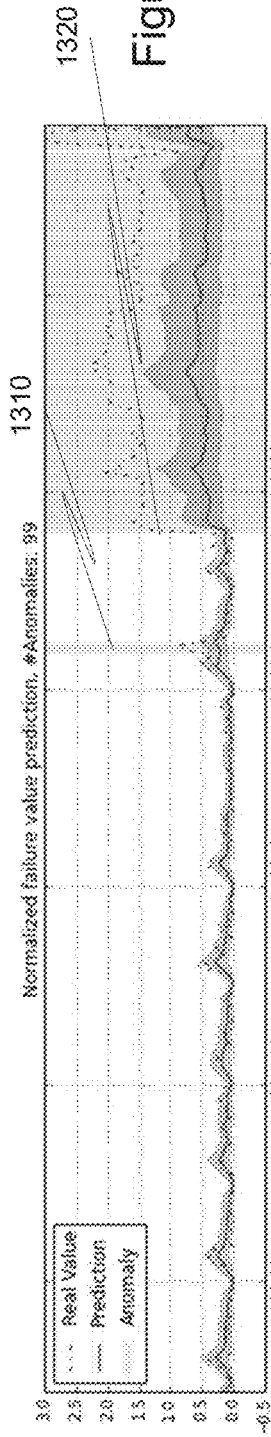
FIGS. 13a-13d illustrate time-series' of the measured values and the predicted values of ASLESV parameters, as well as the associated variability. The figure highlights the exemplary times when corrective actions need to be taken by a system administer or an IT technician.
Figure 13B:
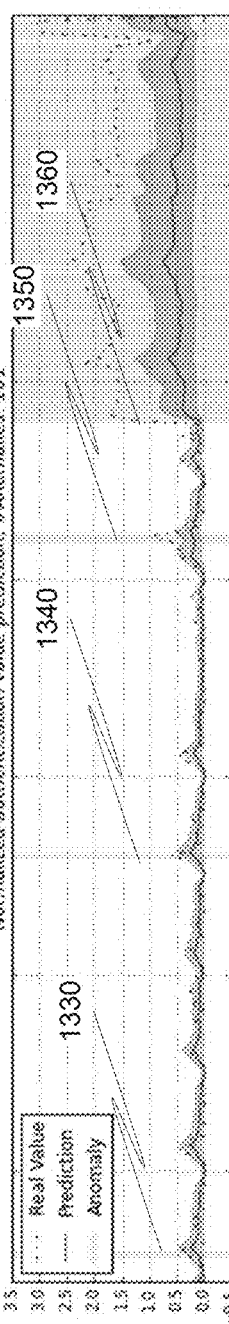
Figure 13C:
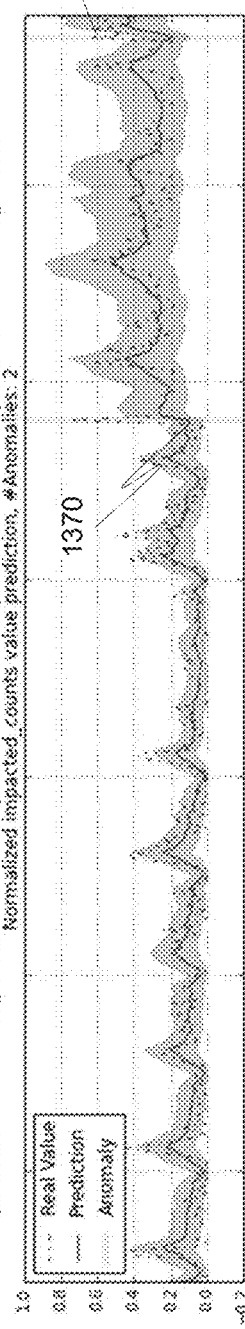
Figure 13D:
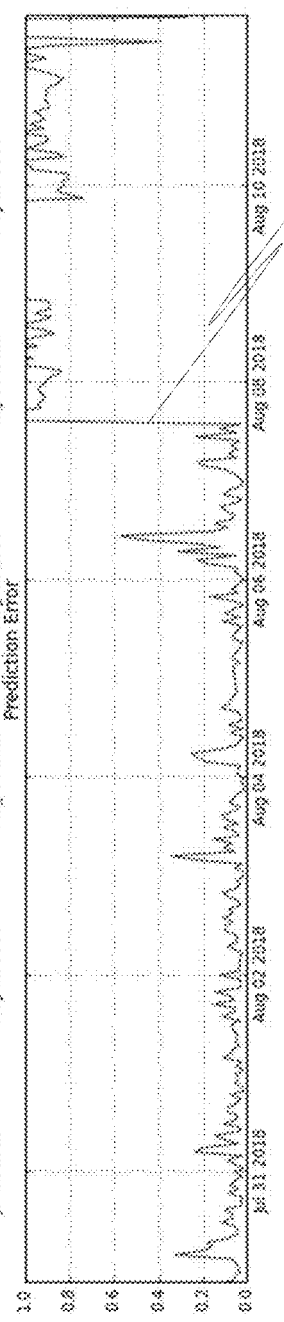

FIGS. 13*a-d* illustrates measured (real) values for three different SLESV parameters and the associated predicted variability (Pi Min, and Pi Max) based on the prediction model. Specifically, the real measured values are drawn in dotted line, the predicted value is illustrated by a solid line, and the variability (values of the predicted Pi Min and Pi Max) are illustrated by the gray area. FIGS. 13*a*, 13*b*, and 13*c* provide the above values for the number of failed connections, authentication failures, and the number of impacted clients, respectively. All the values and their associated variability are normalized so as to remove the dependency on the number of wireless clients in the system. Those skilled in the art should recognize that similar values can be drawn for any other SLE parameter.

As can be seen in exemplary FIG. 13*a*, the measured number of failures to connect to the network is within the variability of the predicted value until the end of Aug. 6, 2018. At that time, 1310, the number of failures exceeds for a short time the predicted Pi Max value of ASLESV. As described in reference to FIG. 12, step 1230 identifies this and the method proceeds to step 1235 where the duration of the abnormality (time wherein the measured value is greater than the predicted Pi Max or smaller than the predicted Pi Min) is measured. Since the abnormality is found to be shorter than a threshold, no action is taken. The short abnormality duration is painted in pink in the figure.

However, towards the end of Aug. 7, 2018, denoted as 1320, the number of measured failures exceeds the predicted value Pi Max for a length of time longer than the time threshold and, as such, the method proceeds to step 1245 where an appropriate automated action, as described above, is invoked.

In accordance with a second exemplary embodiment, the method does not measure the duration of the abnormality and moves to take an action in step 1245 immediately as the value of a measured parameter exceeds the adjusted predicted value.

In accordance with yet another exemplary aspect, the training of the prediction model continues on an ongoing basis. Referring to FIG. 12, as soon as the SLE parameters are observed and stored, as marked with the letter A, the process continues to step 620 of process 600 whenever the method determines the variability of the SLE parameters with respect to the starting time of the period window, t0. To this end, the output of step 1220 is used as an input to step 620 of method 600 for the process of keeping the predictive model current. Similarly, the measured SLESV parameters are also used as an input for step 815 of method 800 and serve to keep the variability of the measured value up to date.

Referring to FIG. 13*b*, the exemplary number of failed authentications is illustrated. Three short durations wherein the value of the measured SLE parameter value exceeds the predicted value Pi Max of the ASLESV, namely, Jul. 30, 2018, Aug. 3, 2018, and Aug. 6, 2018, denoted as 1330, 1340 and 1350 respectively. These short durations may be shorter than the time threshold and as such step 1240 may not trigger step 1245. However, towards the end of Aug. 7, 2018, denoted as 1360, the number of measured failures exceeds the corresponding predicted value Pi Max of the ASLESV for a length of time longer than the predetermined time threshold and, as such, the method proceeds to step 1245 where an appropriate automated action, such as those described above, is invoked.

FIG. 13*c* illustrates an exemplary number of impacted clients. The number of impacted clients exceeds the corresponding predicted Pi Max only for short time durations on Aug. 7, 2018 and Aug. 11, 2018, denoted as 1370.

Figure 14:
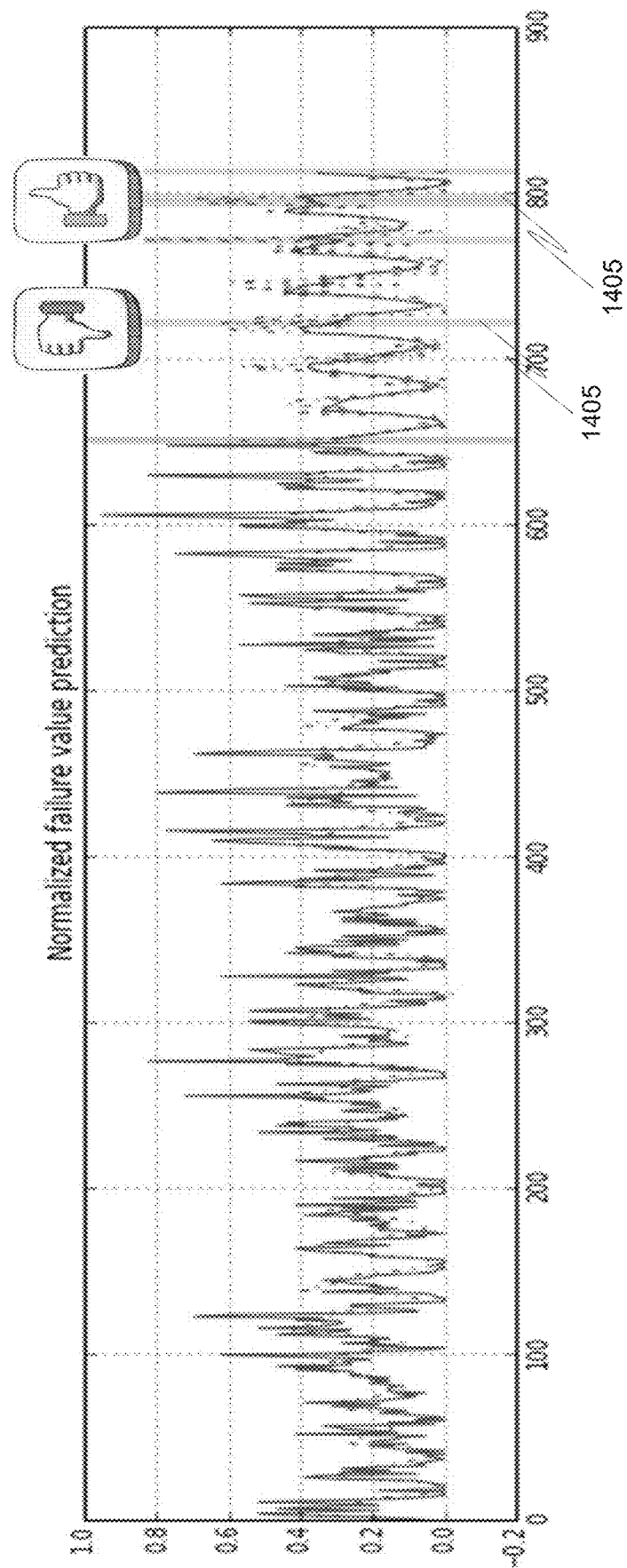
FIG. 14 illustrates an exemplary time series of normalized failure prediction is shown.

Also, optionally, as described above, one of the corrective actions taken may be examination of the issue by an administrator or a technical IT person to determine if the issue requires intervention. Referring to FIG. 14, a time series of normalized failure prediction is shown. The shaded areas 1405 indicate times wherein the measured normalized values exceed the maximum predicted values. For each one of these occurrences, the administrator examines the condition and determines if the issue is real or not as indicated by the thumbs up or down.

In accordance with one exemplary aspect, the system takes a corrective action when any real/measured value exceeds the predicted value Pi Max (for example when an observed number of clients not being able to connect to the network is greater than a predetermined threshold) or is smaller than a predicted value Pi Min (for example when a measured RSSI is smaller than predicted minimum RSSI). In accordance with another embodiment, the system takes a corrective action only when any real/measured value exceeds a predicted duration for example, a period of time longer than a predetermined threshold. In accordance with yet another exemplary aspect measurement of all of the prediction errors of all of the parameters are combined, e.g., by a simple addition or by any other weighted combination, to produce a composite prediction error such as the error illustrated by FIG. 13*d* at a period of time denoted by 1380. An action is then taken when the composite error exceeds a predetermined threshold Numerous additional variations on the above described methods and apparatus are possible.

The techniques of various embodiments may be implemented using software, hardware and/or a combination of software and hardware. Various embodiments are directed to apparatus, e.g., mobile nodes, mobile wireless terminals, base stations, e.g., access points, communications system. Various embodiments are also directed to methods, e.g., method of controlling and/or operating a communications device, e.g., wireless terminals (UEs), base stations, control nodes, access points and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes.

Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the one exemplary aspect.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of this disclosure. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 2.4 Ghz, 5 GHz and/or 60 GHz. However, other embodiments may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:
A method for determining which poor service level occurrences require immediate manual intervention and which poor SLE events would auto-recover, the method comprising:
determining SLE elements;
constructing SLESV;
determining variability/sensitivity to the starting time of the time-window/period;
constructing ASLESV;
constructing predictive model;
feeding measured MTS of SLESV into the predictive model and predicting ASLESV;
taking an action based on the determination whether the measured SLESV parameter falls within the expected/predicted Pi Max and Pi Min of the predicted ASLESV value.
Any one or more of the above aspects wherein determining SLE elements comprising counting the number of one or more of the following within a predetermined time period:
number of clients failing to connect to the network,
number of clients successfully connecting to the network,
number of clients that failed authentication,
number of clients that failed to associate,
number of clients that failed to get IP address from DHCP,
number of clients that failed for unknown reason,
number of unique clients,
number of unique clients that failed to connect to network; and
one or more of the optional seasonal elements comprising one or more of:
day of the week,
time in the day.
Any one or more of the above aspects wherein determining SLE elements comprising:
creating RSSI bins, each bin corresponding to RSSI level being greater than first threshold and smaller than a second threshold;
counting the number of occurrences within a predetermined time period that the measured RSSI falls within the RSSI boundaries of each RSSI bin;
one or more of the optional seasonal elements comprising one or more of:
time in the day,
day of the week,
week of the year.
Any one or more of the above aspects wherein constructing SLESV comprises:
constructing a vector whose elements of the SLE elements are described herein.
A method for determining the variability (Pi Max and Pi Min) of the SLE parameters wherein the method varies the starting time of the time-window within predetermine range and determines the largest and smaller values of each SLE parameter within a time period/window.

Any one or more of the above aspects wherein taking an action comprises:
ignoring poor SLE measured values when the measured SLESV falls within the expected/predicted SLESV value;
taking correction measures when the measured SLESV falls outside the expected/predicted SLESV value.
Any one or more of the above aspects wherein taking correction measures comprises;
restarting DHCP server;
restarting authentication server;
alerting IT technician;
increasing power of AP radio.
A method for keeping the predictive model current at all times.
A method for taking corrective action only if the value of the measured value exceeds the predicted Pi Max value for duration longer than a predetermined time threshold.
A method for taking corrective action only if the value of the measured value is smaller than the predicted Pi Min value for duration longer than a threshold.

Additional exemplary aspects are directed toward:
A method to determine how a service level experience (SLE) event in a communications environment should be addressed comprising:
determining a plurality of SLE elements;
constructing a multi-dimensional SLE status vector (SLESV);
determining variability of one or more SLE elements based on varying a starting time of a measurement time-window;
constructing an augmented service level experience status vector (ASLESV);
developing a predictive model;
inputting a measured multivariate time-series (MTS) to the predictive model;
predicting, using a controller and storage, an augmented service level experience status vector;
identifying and initiating an action at least based on a determination whether a measured SLESV parameter falls within an expected or predicted Pi Max and Pi Min of the predicted ASLESV value, wherein Pi Max is a predicted maximum value of parameter Pi of the ASLESV and Pi Min is a predicted minimum value of parameter Pi of the ASLESV.

Any of the above aspects, wherein the determining of the plurality of SLE elements includes counting a number of one or more of the following within a predetermined time window: number of clients failing to connect to a network, number of clients successfully connecting to the network, number of clients that failed authentication, number of clients that failed to associate, number of clients that failed to get an IP address from a DHCP server, number of clients that failed for unknown reason, number of unique clients, and/or number of unique clients that failed to connect to network.

Any of the above aspects, wherein the determining of the plurality of SLE elements includes counting a number of one or more of the following seasonal elements within a predetermined time window: day of the month, day of the year, day of a week and time in a day.

Any of the above aspects, wherein determining the plurality of SLE elements comprises creating a plurality of RSSI (Received Signal Strength Indication) bins, each bin corresponding to a RSSI level being greater than a respective first threshold and smaller than a second respective threshold, and counting a number of occurrences within a predetermined time period that the measured RSSI falls within RSSI boundaries of each RSSI bin.

Any of the above aspects, wherein constructing the SLESV includes generating a vector whose elements include one or more of the plurality of SLE elements.

Any of the above aspects, wherein the action includes one or more of: restarting a DHCP server, restarting an authentication server, alerting a technician, increasing power of radio, changing a channel, changing a bandwidth, changing a power level, shutting down or blocking a port, switching a broadcast to unicast, renewing a security certificate(s) of user devices, configuring a switch, restarting a switch, testing cable, disconnecting a specific client, rebooting an AP or other device, adding legacy support, alerting an IT technician, re-initiating a radio, stopping or limiting a guest portal access, restarting a DHCP server, and/or restarting a AAA server.

Any of the above aspects, further comprising maximum and minimum values for each one of the elements of each SLESV within the MTS are determined, and creating the augmented service level experience status vector, ASLESV, by adding maximum and minimum values as elements to the SLESV for each time window.

Any of the above aspects, further comprising triggering a new predictive model parameters adaptation when it is determined that an error between measured SLESV parameters and predicted values exceeds a predetermined threshold for a predetermined duration.

Any of the above aspects, wherein the action is to mitigate an abnormal SLE and/or the inputting of the measured multivariate time-series (MTS) to the predictive model occurs periodically.

Any of the above aspects, wherein the service level experience (SLE) event is within a monitored communications environment.

A system that determines how a service level experience (SLE) event in a communications environment should be addressed comprising:

a processor connected to a memory, the memory storing instructions that when executed:

determine a plurality of SLE elements;

construct a multi-dimensional SLE status vector (SLESV) for a given time duration;

determine variability of SLE elements based on varying a starting time of a measurement time-window;

construct an augmented service level experience status vector (ASLESV);

develop a predictive model;

input a measured multivariate time-series (MTS) to the predictive model;

predict an augmented service level experience status vector;

identify and initiate an action at least based on a determination whether a measured SLESV parameter falls within an expected or predicted Pi Max and Pi Min of the predicted ASLESV value, wherein Pi Max is a predicted maximum value of parameter Pi of the ASLESV and Pi Min is a predicted minimum value of parameter Pi of the ASLESV.

Any of the above aspects, wherein the determining of the plurality of SLE elements includes counting a number of one or more of the following within a predetermined time window: number of clients failing to connect to a network, number of clients successfully connecting to the network, number of clients that failed authentication, number of clients that failed to associate, number of clients that failed to get an IP address from a DHCP server, number of clients that failed for unknown reason, number of unique clients, and/or number of unique clients that failed to connect to network.

Any of the above aspects, wherein the determining of the plurality of SLE elements includes counting a number of one or more of the following seasonal elements within a predetermined time window: day of the month, day of the year, day of a week and time in a day.

Any of the above aspects, wherein determining the plurality of SLE elements comprises creating RSSI (Received Signal Strength Indication) bins, each bin corresponding to a RSSI level being greater than first threshold and smaller than a second threshold and counting a number of occurrences within a predetermined time period that the measured RSSI falls within RSSI boundaries of each RSSI bin.

Any of the above aspects, wherein constructing the SLESV includes generating a vector whose elements include one or more of the plurality of SLE elements.

Any of the above aspects 1, wherein the action includes one or more of: restarting a DHCP server, restarting an authentication server, alerting a technician, increasing power of radio, changing a channel, changing a bandwidth, changing a power level, shutting down or blocking a port, switching a broadcast to unicast, renewing a security certificate(s) of user devices, configuring a switch, restarting a switch, testing cable, disconnecting a specific client, rebooting an AP or other device, adding legacy support, alerting an IT technician, re-initiating a radio, stopping or limiting a guest portal access, restarting a DHCP server, and/or restarting a AAA server.

Any of the above aspects, further comprising maximum and minimum values for each one of the elements of each SLESV within the MTS are determined, and creating the augmented service level experience status vector, ASLESV, by adding maximum and minimum values as elements to the SLESV for each time window.

Any of the above aspects, further comprising triggering a new predictive model parameters adaptation when it is determined that an error between measured SLESV parameters and predicted values exceeds a predetermined threshold for a predetermined duration.

Any of the above aspects, wherein the action is to mitigate an abnormal SLE and/or the inputting of the measured multivariate time-series (MTS) to the predictive model occurs periodically.

Any of the above aspects, wherein the service level experience (SLE) event is within a monitored communications environment.

A non-transitory computer readable information storage media having thereon instructions that when executed perform any one or more of the above aspects.

A system on a chip (SoC) including any one or more of the above aspects.

One or more means for performing any one or more of the above aspects.

Any one or more of the aspects as substantially described herein.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications reliability. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A method to determine how a service level experience (SLE) event in a communications environment should be addressed comprising:
    determining, during each of a plurality of time periods, values of a plurality of SLE elements;
    constructing a time series of multi-dimensional SLE status vectors (SLESV), the constructing based on the values of the plurality of SLE element values determined during each of the plurality of time periods;
    constructing a second time series of multi-dimensional augmented service level experience status vectors (ASLESV), each dimension of the ASLESVs indicating, for each of the plurality of time periods, an SLE element value, a minimum value of the SLE element, and a maximum value of the SLE element, the minimum and maximum values based on SLE element values determined during time periods longer than each of the plurality of time periods;
    inputting the second time-series (MTS) to a predictive model;
    predicting, based on the inputting and the predictive model, an ASLESV, the ASLESV including predicted minimum and maximum values of each of the SLE elements included in the time series;
    initiating an action at least based on a determination of whether a measured SLESV parameter falls within a predicted minimum or maximum value of the SLESV parameter value of the predicted ASLESV.

2. The method of claim 1, wherein the determining of the values of the plurality of SLE elements includes counting a number of one or more of the following within a predetermined time window: number of clients failing to connect to a network, number of clients successfully connecting to the network, number of clients that failed authentication, number of clients that failed to associate, number of clients that failed to get an IP address from a DHCP server, number of clients that failed for unknown reason, number of unique clients, and/or number of unique clients that failed to connect to network.

3. The method of claim 2, wherein the determining of the values of the plurality of SLE elements includes counting a number of one or more of the following seasonal elements within a predetermined time window: day of a month, day of a year, day of a week and time in a day.

4. The method of claim 2, wherein determining of the values of the plurality of SLE elements comprises creating a plurality of RSSI (Received Signal Strength Indication) bins, each bin corresponding to a RSSI level being greater than a respective first threshold and smaller than a second respective threshold, and counting a number of occurrences within a predetermined time period that a RSSI value falls within RSSI boundaries of each RSSI bin.

5. The method of claim 1, wherein the action includes one or more of: restarting a DHCP server, restarting an authentication server, alerting a technician, increasing power of radio, changing a channel, changing a bandwidth, changing a power level, shutting down or blocking a port, switching a broadcast to unicast, renewing a security certificate(s) of user devices, configuring a switch, restarting a switch, testing cable, disconnecting a specific client, rebooting an AP or other device, adding legacy support, alerting an IT technician, re-initiating a radio, stopping or limiting a guest portal access, restarting a DHCP server, and/or restarting a AAA server.

6. The method of claim 1, further comprising triggering a new predictive model parameters adaptation when it is determined that an error between measured SLESV parameters values and predicted values exceeds a predetermined threshold for a predetermined duration.

7. The method of claim 1, wherein the inputting of the second time-series (MTS) to the predictive model occurs periodically.

8. The method of claim 1, further comprising:
determining a value of an SLE element during a first time period;
determining a minimum value of the SLE element for a second time period, the second time period beginning prior to the first time period and ending after the first time period;
including the value and the minimum value in a single dimension of an ASLESV; and
inputting the ASLESV to the predictive model.

9. The method of claim 8, further comprising:
determining a maximum value of the SLE element during the second time period; and
including the maximum value in the single dimension of the ASLESV.

10. The method of claim 9, further comprising:
determining values of a plurality of SLE elements during the first time period;
determining a minimum value of each of the plurality of SLE elements during the second time period; and
including the plurality of SLE elements in a corresponding plurality of dimensions of the ASLESV.

11. A system that determines how a service level experience (SLE) event in a communications environment should be addressed comprising:
one or more hardware processors connected to a memory, the memory storing instructions that when executed configure the one or more hardware processors to perform operations comprising:
determining, during each of a plurality of time periods, values of a plurality of SLE elements;
constructing a time series of multi-dimensional SLE status vectors (SLESV, the constructing based on the values of the plurality of SLE element values determined during each of the plurality of time periods;
constructing a second time series of multi-dimensional augmented service level experience status vectors (ASLESV), each dimension of the ASLESVs indicating, for each of the plurality of time periods, an SLE element value, a minimum value of the SLE element, and a maximum value of the SLE element, the minimum and maximum values based on SLE element values determined during time periods longer than each of the plurality of time periods;
inputting the second time-series (MTS) to a predictive model;
predicting, based on the inputting and the predictive model, an ASLESV, the ASLESV including predicted minimum and maximum values of each of the SLE elements included in the time series;
initiating an action at least based on a determination of whether a measured SLESV parameter falls within a predicted minimum or maximum value of the SLESV parameter value of the predicted ASLESV.

12. The system of claim 11, wherein the determining of the values of the plurality of SLE elements includes counting a number of one or more of the following within a predetermined time window: number of clients failing to connect to a network, number of clients successfully connecting to the network, number of clients that failed authentication, number of clients that failed to associate, number of clients that failed to get an IP address from a DHCP server, number of clients that failed for unknown reason, number of unique clients, and/or number of unique clients that failed to connect to network.

13. The system of claim 12, wherein the determining of the values of the plurality of SLE elements includes counting a number of one or more of the following seasonal elements within a predetermined time window: day of a month, day of the year, day of a week and time in a day.

14. The system of claim 12, wherein determining the values of the plurality of SLE elements comprises creating RSSI (Received Signal Strength Indication) bins, each bin corresponding to a RSSI level being greater than first threshold and smaller than a second threshold and counting a number of occurrences within a predetermined time period that a measured RSSI falls within RSSI boundaries of each RSSI bin.

15. The system of claim 11, wherein the action includes one or more of: restarting a DHCP server, restarting an authentication server, alerting a technician, increasing power of radio, changing a channel, changing a bandwidth, changing a power level, shutting down or blocking a port, switching a broadcast to unicast, renewing a security certificate(s) of user devices, configuring a switch, restarting a switch, testing cable, disconnecting a specific client, rebooting an AP or other device, adding legacy support, alerting an IT technician, re-initiating a radio, stopping or limiting a guest portal access, restarting a DHCP server, and/or restarting a AAA server.

16. The system of claim 11, further comprising triggering a new predictive model parameters adaptation when it is determined that an error between measured SLESV parameters and predicted values exceeds a predetermined threshold for a predetermined duration.

17. The system of claim 11, wherein the inputting of the second time-series (MTS) to the predictive model occurs periodically.

18. A non-transitory computer readable storage medium comprising instructions that when executed configure hardware processing circuitry to perform operations to determine how a service level experience (SLE) event in a communications environment should be addressed, the operations comprising:

determining, during each of a plurality of time periods, values of a plurality of SLE elements;

constructing a time series of multi-dimensional SLE status vectors (SLESV), the constructing based on the values of the plurality of SLE element values determined during each of the plurality of time periods;

constructing a second time series of multi-dimensional augmented service level experience status vectors (ASLESV), each dimension of the ASLESVs indicating, for each of the plurality of time periods, an SLE element value, a minimum value of the SLE element, and a maximum value of the SLE element, the minimum and maximum values based on SLE element values determined during time periods longer than each of the plurality of time periods;

inputting the second time-series (MTS) to a predictive model;

predicting, based on the inputting and the predictive model, an ASLESV, the ASLESV including predicted minimum and maximum values of each of the SLE elements included in the time series;

initiating an action at least based on a determination of whether a measured SLESV parameter falls within a predicted minimum or maximum value of the SLESV parameter value of the predicted ASLESV.

* * * * *

UNITED STATES PATENT AND TRADEMARK OFFICE
CERTIFICATE OF CORRECTION

| | |
|---|---|
| PATENT NO. | : 10,958,537 B2 |
| APPLICATION NO. | : 16/251942 |
| DATED | : March 23, 2021 |
| INVENTOR(S) | : Ebrahim Safavi |

It is certified that error appears in the above-identified patent and that said Letters Patent is hereby corrected as shown below:

On the Title Page

Item (71): Replace "Mist Systems, Inc., Cupertino, CA (US)" with --Juniper Networks, Inc., Sunnyvale, CA (US)--

Item (72): Replace "S. Ebrahim Safavi" with --Ebrahim Safavi--

Signed and Sealed this
Twenty-seventh Day of February, 2024

Katherine Kelly Vidal
*Director of the United States Patent and Trademark Office*